US012793247B2

(12) United States Patent
Catt et al.

(10) Patent No.: US 12,793,247 B2
(45) Date of Patent: Nov. 10, 2026

(54) AGENT DATA PROCESSING

(71) Applicant: Commonwealth Scientific and Industrial Research Organisation, Acton (AU)

(72) Inventors: Gavin Catt, Acton (AU); Kazys Stepanas, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 0 days.

(21) Appl. No.: 18/837,922

(22) PCT Filed: Feb. 10, 2023

(86) PCT No.: PCT/AU2023/050094

§ 371 (c)(1),
(2) Date: Aug. 13, 2024

(87) PCT Pub. No.: WO2023/150839

PCT Pub. Date: Aug. 17, 2023

(65) Prior Publication Data

US 2025/0139804 A1 May 1, 2025

(30) Foreign Application Priority Data

Feb. 14, 2022 (AU) ................................ 2022900312

(51) Int. Cl.
*G06T 7/579* (2017.01)
*G01S 17/08* (2006.01)
(Continued)

(52) U.S. Cl.
CPC .............. *G06T 7/579* (2017.01); *G01S 17/08* (2013.01); *G01S 17/89* (2013.01);
(Continued)

(58) Field of Classification Search
None
See application file for complete search history.

(56) References Cited

U.S. PATENT DOCUMENTS 9,959,671 B1 * 5/2018 Carriere, IV ........... G06T 15/04
11,221,831 B1 1/2022 Al Khafaji et al.
(Continued)

FOREIGN PATENT DOCUMENTS

EP 4095486 A1 * 11/2022 ........... G01C 21/206

OTHER PUBLICATIONS

Machine Translation of Chinese Patent Application CN 111583093 A, published Aug. 25, 2020. (Year: 2020).*
(Continued)

*Primary Examiner* — Steven G Snyder
(74) *Attorney, Agent, or Firm* — Birch, Stewart, Kolasch & Birch, LLP

(57) ABSTRACT

A method for processing agent data received from one or more agents traversing an environment for use in a simultaneous localisation and mapping process. The method includes determining a pipeline including a number of nodes, and a node configuration for some of the nodes. Each node relates to a respective data processing task implemented using a respective software module, the nodes being interconnected so as to define a node sequence representing a sequence of data processing tasks. The node and pipeline are then used to load and configure software modules, which are then executed to provide output data from at least one software module as processed agent data, wherein the processed agent data is used in a simultaneous localisation and mapping process.

20 Claims, 21 Drawing Sheets

(51) Int. Cl.

| | |
|---|---|
| ***G01S 17/89*** | (2020.01) |
| ***G05B 19/042*** | (2006.01) |
| ***G06F 9/445*** | (2018.01) |
| ***G06F 11/34*** | (2006.01) |

(52) U.S. Cl.

CPC ..... *G05B 19/0426* (2013.01); *G06F 9/44526* (2013.01); *G06F 11/3409* (2013.01); *G06T 2207/10028* (2013.01); *G06T 2207/30252* (2013.01)

(56) References Cited

U.S. PATENT DOCUMENTS

| | | | | |
|---|---|---|---|---|
| 11,670,047 | B2 * | 6/2023 | Das | G06T 7/77 382/285 |
| 12,092,476 | B2 * | 9/2024 | Drinkard | G01C 21/3804 |
| 2019/0347106 | A1 | 11/2019 | Kadowaki et al. | |
| 2020/0240794 | A1 | 7/2020 | Prasser et al. | |
| 2020/0263995 | A1 | 8/2020 | Gaal et al. | |
| 2021/0042996 | A1 * | 2/2021 | Das | G06T 7/75 |
| 2021/0163021 | A1 * | 6/2021 | Frazzoli | B60W 50/023 |
| 2021/0199460 | A1 | 7/2021 | Yerli | |
| 2021/0248165 | A1 | 8/2021 | Fry | |
| 2021/0293546 | A1 | 9/2021 | Zhang et al. | |
| 2025/0336151 | A1 * | 10/2025 | Yuan | G06F 9/547 |
| 2025/0342398 | A1 * | 11/2025 | Li | G06N 20/00 |

OTHER PUBLICATIONS

Machine Translation of Chinese Patent Application CN 111397521 A, published Jul. 10, 2020. (Year: 2020).*

'Modelling Software Architecture for Visual Simultaneous Localization and Mapping' by Mishra et al., Published: Apr. 2, 2021. (Year: 2021).*

International Search Report, issued in PCT/AU2023/050094, dated Apr. 19, 2023.

Written Opinion of the International Searching Authority, issued in PCT/AU2023/050094, dated Apr. 19, 2023.

* cited by examiner

Fig. 10C
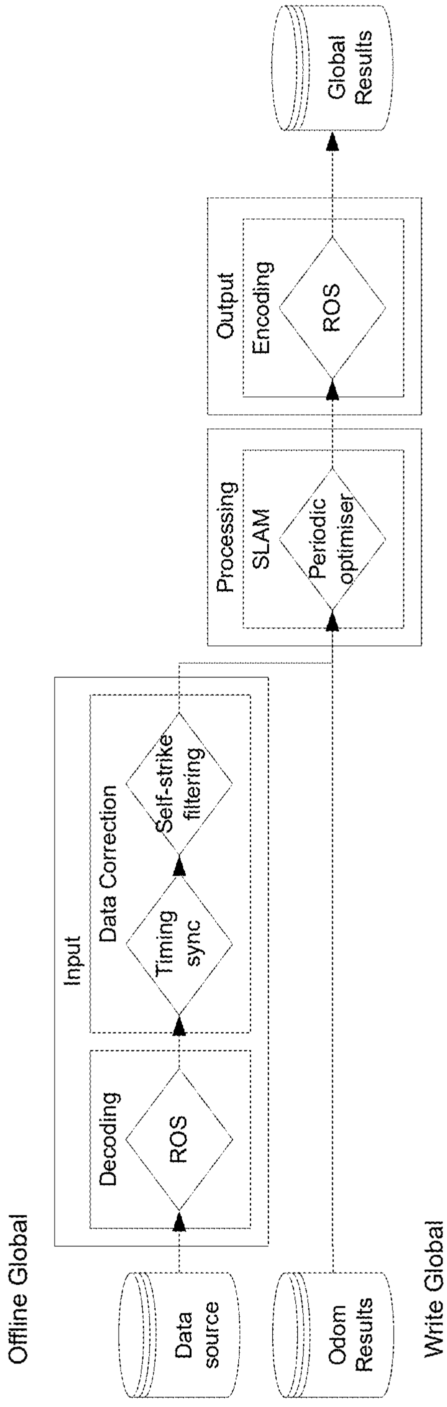
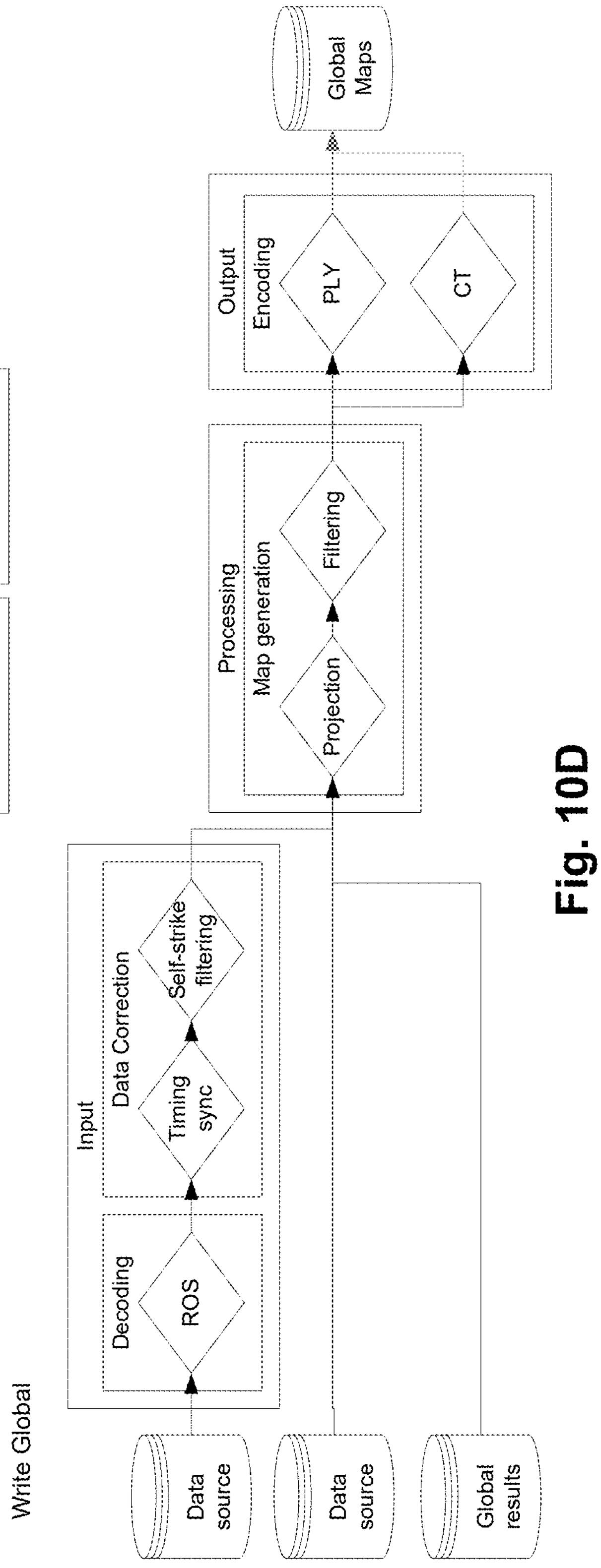
Fig. 10D

AGENT DATA PROCESSING

BACKGROUND OF THE INVENTION

The present invention relates to a system and method for processing agent data received from one or more agents traversing an environment for use in a simultaneous localisation and mapping process. In one particular example, the system and method involve using a pipeline allowing the data processing to be more easily configured and/or performed depending on the nature of the agent data and the particular outcomes desired.

DESCRIPTION OF THE PRIOR ART

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

It is known to use agents, such as autonomous vehicles equipped with three-dimensional (3D) mapping systems, to generate maps of environments. Such systems typically use a range sensor, such as a LiDAR range scanner, which measures reflected laser light to find the range of part of the environment, with this information in turn being used to create point clouds. Suitable analysis of the range data allows the agent to localise itself within the environment, allowing the agent to navigate within the environment whilst generating the map of the environment.

Simultaneous localization and mapping (SLAM) is the computational problem of constructing or updating a map of an unknown environment while simultaneously keeping track of an agent's location within it. The process typically involves multiple stages, including receiving and time synchronising sensor data from multiple sensors, analysing the sensor data to determine a point cloud, processing and filtering the point cloud to generate a map, and generating a trajectory of the agent within the map. Several known algorithms are regularly used in such analysis, and popular approximate solution methods include a particle filter, extended Kalman filter, covariance intersection, and GraphSLAM.

In general there is significant overlap between different approaches used, and yet the approaches need to be adapted for particular circumstances, for example to take into account capabilities of the sensors used, and the desired outcomes, such as levels of accuracy, processing time, or the like. Under current approaches, analysing agent data often requires that custom code is generated for each particular scenario, to analyse collected data and ensure the best outcome is achieved. However, this is complex and time consuming, and creates a high barrier to entry for the processing and use of agent data, which in turn has restricted the deployment of SLAM based systems and agents.

SUMMARY OF THE PRESENT INVENTION

In one broad form, an aspect of the present invention seeks to provide a method for processing agent data received from one or more agents traversing an environment for use in a simultaneous localisation and mapping process, the method including: determining a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in a simultaneous localisation and mapping process; determining a node configuration for at least some of the nodes, the node configuration being indicative of one or more configuration options associated with the respective software module; using the node configuration and pipeline to: load software modules corresponding to the nodes in the pipeline; and, configure at least some of the software modules in accordance with the node configuration; and, executing the software modules by: providing input data to at least one software module based on the agent data, wherein at least some of the agent data includes at least one of: range data captured by a range sensor indicative of a distance between a sensor and part of the environment; point cloud data of at least part of the environment; trajectory data indicative of movement of the agent when traversing at least part of the environment; transferring output data from a software module to a next software module in accordance with the node sequence, so that the output data from the software module becomes input data for the next software module; and, providing output data from at least one software module as processed agent data, wherein the processed agent data is used in a simultaneous localisation and mapping process.

In one embodiment the agent data includes at least one of: sensor data from one or more sensors associated with the agent; point cloud data of at least part of the environment; a map of at least part of the environment; and, trajectory data indicative of movement of the agent when traversing at least part of the environment.

In one embodiment each node includes an interface representing the data processing task, the interface acting as an input configured to receive input data and an output configured to provide output data.

In one embodiment the configuration options include at least one of: an input configuration; an output configuration; and, a processor configuration.

In one embodiment: the input data configuration is indicative of: an input data format; and, input data content; and, the output data configuration is indicative of an output data format; an output data format; and, output data content.

In one embodiment the method includes determining a pipeline by: determining processing requirements for the agent data; and, using the processing requirements to at least one of: retrieving one of a number of defined pipelines; and, creating a pipeline.

In one embodiment the method includes creating a pipeline by: obtaining a number of nodes; and, interconnecting the nodes to define the node sequence in accordance with the processing requirements.

In one embodiment the pipeline includes branches in which one node is connected to at least two other nodes so that output data from a software module is provided as input data to at least two other software modules.

In one embodiment the method includes obtaining a node by: selecting one of a number of defined nodes; and, creating a node.

In one embodiment the method includes creating a node by: selecting one of a number of available interfaces, each interface representing a data processing task; and, generating a software module in accordance with requirements associated with the interface.

In one embodiment the method includes registering the node with the node factory.

In one embodiment the method includes selecting a node by: selecting one of a number of available interfaces, each interface representing a respective data processing task; and, selecting one of a number of available software modules associated with the selected interface, each software modules being a respective implementation of the data processing task.

In one embodiment the method includes selecting the nodes using a node factory.

In one embodiment the method includes: retrieving one or more of a number of defined workflows, each workflow being indicative of a sequence of one or more data processing tasks; and, creating the pipeline using the one or more of the workflows.

In one embodiment the workflow includes a number of interfaces and the method includes selecting one of a number of available software modules associated each interface.

In one embodiment the method includes: determining an agent state for the one or more agents, the agent state being indicative of one or more of: sensors associated with the agent; a sensor transformation representing a physical geometry of the sensors associated with the agent; and, one or more trajectory types associated with the agent; and, using the state to at least one of: select one or more nodes; retrieve one or more of a number of defined workflows; and, retrieve one of a number of defined pipelines.

In one embodiment the method includes: determining additional data requirements; and, using the additional data requirements to at least one of: select one or more nodes; retrieve one or more of a number of defined workflows; and, retrieve one of a number of defined pipelines.

In one embodiment the additional data requirements include at least one of: input files; and, calibration files.

In one embodiment the method includes: determining an agent state; retrieving sensor details of the sensors associated with the agent; determining a pipeline in accordance with the sensor details and processing requirements for the agent data; validating additional data requirements are met for the pipeline; and, generating the configuration file for the pipeline.

In one embodiment the software modules are implemented as plugins to the interfaces.

In one embodiment the software modules are loaded dynamically during the execution phase.

In one embodiment the software modules are implemented at least one of: using executable modules; using class/inheritance modules; and, by invoking functions.

In one embodiment the method includes, in a node factory, implementing a selected node by: determining the node configuration for a selected node; converting the configuration into a specification in accordance with a converter supplied by the selected node; initialising the node; providing the specification to the node, to allow the node to configure internal processes; and, providing the constructed node.

In one embodiment the data is transferred between software modules using messages including: a header including pipeline data indicative of at least one of: a capture time of sensor data; an agent that captured the sensor data; and, a frame; and, a payload including at least one of: sensor data; processed sensor data; and, output data from a previous software module.

In one embodiment the nodes are configured to at least one of: perform calibration; process sensor data; generate a point cloud; generate a map; generate a sensor trajectory within an environment; translate data between different reference frames; convert data between different formats; perform filtering; perform a simultaneous mapping and localisation process; and, generate a simultaneous mapping and localisation process output.

In one embodiment the method includes: in a configuration phase, generating a configuration file based on the pipeline and node configurations; and, in an execution phase, using the configuration file to: load software modules corresponding to the nodes in the pipeline; and, configure at least some of the software modules in accordance with the node configuration.

In one broad form, an aspect of the present invention seeks to provide a system for processing agent data received from one or more agents traversing an environment for use in a simultaneous localisation and mapping process, the system including one or more suitably programmed processing devices configured to: determine a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in a simultaneous localisation and mapping process; determine a node configuration for at least some of the nodes, the node configuration being indicative of one or more configuration options associated with the respective software module; use the node configuration and pipeline to: load software modules corresponding to the nodes in the pipeline; and, configure at least some of the software modules in accordance with the node configuration; and, execute the software modules by: providing input data to at least one software module based on the agent data, wherein at least some of the agent data includes at least one of: range data captured by a range sensor indicative of a distance between a sensor and part of the environment; point cloud data of at least part of the environment; trajectory data indicative of movement of the agent when traversing at least part of the environment; transferring output data from a software module to a next software module in accordance with the node sequence, so that the output data from the software module becomes input data for the next software module; and, provide output data from at least one software module as processed agent data, wherein the processed agent data is used in a simultaneous localisation and mapping process.

In one broad form, an aspect of the present invention seeks to provide a computer program product for processing agent data received from one or more agents traversing an environment for use in a simultaneous localisation and mapping process, the computer program product including computer executable code that when executed by one or more suitably programmed processing devices causes the one or more processing devices to: determine a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in a simultaneous localisation and mapping process; determine a node configuration for at least some of the nodes, the node configuration being indicative of one or more configuration options associated with the respective software module; use the node configuration and pipeline to: load software modules corresponding to the nodes in the pipeline; and, configure at least some of the software modules in accordance with the node configuration; and, execute the software modules by: providing input data to at least one software module based on the agent data, wherein at least some of the agent data includes at least one of: range data captured by a range sensor indicative of a distance between a sensor and part of the environment; point cloud data of at least part of the environment; trajectory data indicative of movement of the agent when traversing at least part of the environment; transferring output data from a software module to a next software module in accordance with the node sequence, so that the output data from the software module becomes input data for the next software module; and, provide output data from at least one software module as processed agent data, wherein the processed agent data is used in a simultaneous localisation and mapping process.

In one broad form, an aspect of the present invention seeks to provide a method for processing agent data received from one or more agents traversing an environment for use in a simultaneous localisation and mapping process, the method including: acquiring a configuration file indicative of: a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in a simultaneous localisation and mapping process; and, a node configuration for at least some of the nodes, the node configuration being indicative of one or more configuration options associated with the respective software module; loading software modules corresponding to the nodes in the pipeline; configuring at least some of the software modules in accordance with the node configuration; and, executing the software modules by: providing input data to at least one software module based on the agent data, wherein at least some of the agent data includes at least one of: range data captured by a range sensor indicative of a distance between a sensor and part of the environment; point cloud data of at least part of the environment; trajectory data indicative of movement of the agent when traversing at least part of the environment; transferring output data from a software module to a next software module in accordance with the node sequence, so that the output data from the software module becomes input data for the next software module; and, providing output data from at least one software module as processed agent data, wherein the processed agent data is used in a simultaneous localisation and mapping process.

In one broad form, an aspect of the present invention seeks to provide a system for processing agent data received from one or more agents traversing an environment for use in a simultaneous localisation and mapping process, the system including one or more processing devices configured to: acquire a configuration file indicative of: a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in a simultaneous localisation and mapping process; and, a node configuration for at least some of the nodes, the node configuration being indicative of one or more configuration options associated with the respective software module; load software modules corresponding to the nodes in the pipeline; configure at least some of the software modules in accordance with the node configuration; and, execute the software modules by: providing input data to at least one software module based on the agent data, wherein at least some of the agent data includes at least one of: range data captured by a range sensor indicative of a distance between a sensor and part of the environment; point cloud data of at least part of the environment; trajectory data indicative of movement of the agent when traversing at least part of the environment; transferring output data from a software module to a next software module in accordance with the node sequence, so that the output data from the software module becomes input data for the next software module; and, providing output data from at least one software module as processed agent data, wherein the processed agent data is used in a simultaneous localisation and mapping process.

In one broad form, an aspect of the present invention seeks to provide a computer program product for processing agent data received from one or more agents traversing an environment for use in a simultaneous localisation and mapping process, the computer program product including computer executable code that when executed by one or more suitably programmed processing devices causes the one or more processing devices to: acquire a configuration file indicative of: a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in a simultaneous localisation and mapping process; and, a node configuration for at least some of the nodes, the node configuration being indicative of one or more configuration options associated with the respective software module; load software modules corresponding to the nodes in the pipeline; configure at least some of the software modules in accordance with the node configuration; and, execute the software modules by: providing input data to at least one software module based on the agent data, wherein at least some of the agent data includes at least one of: range data captured by a range sensor indicative of a distance between a sensor and part of the environment; point cloud data of at least part of the environment; trajectory data indicative of movement of the agent when traversing at least part of the environment; transferring output data from a software module to a next software module in accordance with the node sequence, so that the output data from the software module becomes input data for the next software module; and, providing output data from at least one software module as processed agent data, wherein the processed agent data is used in a simultaneous localisation and mapping process.

In one broad form, an aspect of the present invention seeks to provide a method for processing agent data received from one or more agents traversing an environment for use in a simultaneous localisation and mapping process, the method including: determining a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in a simultaneous localisation and mapping process; determining a node configuration for at least some of the nodes, the node configuration being indicative of one or more configuration options associated with the respective software module; and, generating a configuration file based on the pipeline and the node configurations, wherein the configuration file is usable to configure software modules to perform processing of agent data. A system for processing agent data received from one or more agents traversing an environment for use in a simultaneous localisation and mapping process, the system including one or more processing devices configured to: determine a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in a simultaneous localisation and mapping process; determine a node configuration for at least some of the nodes, the node configuration being indicative of one or more configuration options associated with the respective software module; and, generate a configuration file based on the pipeline and the node configurations, wherein the configuration file is usable to configure software modules to perform processing of agent data.

In one broad form, an aspect of the present invention seeks to provide a computer program product for processing agent data received from one or more agents traversing an environment for use in a simultaneous localisation and mapping process, the computer program product including computer executable code that when executed by one or more suitably programmed processing devices causes the one or more processing devices to: determine a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in a simultaneous localisation and mapping process; determine a node configuration for at least some of the nodes, the node configuration being indicative of one or more configuration options associated with the respective software module; and, generate a configuration file based on the pipeline and the node configurations, wherein the configuration file is usable to configure software modules to perform processing of agent data.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:

FIGS. 10A to 10H are examples of pipelines incorporating duplicate workflows;

DETAILED DESCRIPTION OF THE PREFERRED EMBODIMENTS

Figure 1:
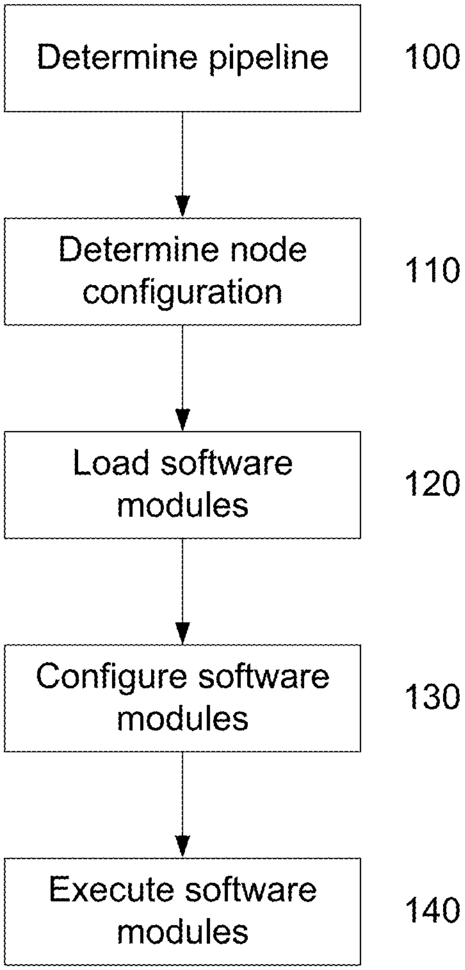
FIG. 1 is a flow chart of an example of a method for processing agent data.

An example of a process for processing agent data received from one or more agents will now be described with reference to FIG. 1.

For the purpose of illustration, it is assumed that the process is performed at least in part using one or more electronic processing devices, typically forming part of one or more processing systems, such as computers, servers, or the like. Whilst the system can use multiple processing devices, with processing performed by one or more of the devices, for the purpose of ease of illustration, the following examples will refer to a single device. Nevertheless it will be appreciated that reference to a singular processing device should be understood to encompass multiple processing devices and vice versa, with processing being distributed between the devices as appropriate.

Furthermore, it is assumed that agent data is acquired from one or more agents traversing an environment. The nature and number of the agents will vary depending on a range of factors, such as the nature of the environment and the particular application. For example, the agents could include autonomous vehicles, robots, unmanned aerial vehicles (UAVs), or the like, but could also include mapping systems carried by an individual (person) or vehicle. Whilst multiple agents of the same type could be used, in other examples a combination of different types of agents could be used, allowing different parts of the environment to be traversed using different forms of locomotion, for example using a combination of aerial and ground-based drones. The environment could be a natural environment, and could be open, such as an outdoor area, or could be confined, such as in a cave system or similar. The environment could additionally, and/or alternatively, be a constructed environment, such as a building, underground mine, or the like, or a combination of the natural and constructed environments.

The nature of the agent data will depend on the nature of the agent, and sensors utilised within the agent. The agent data typically includes sensor data captured from one or more sensors, such as range data captured by a range sensor, such as a LiDAR, stereoscopic cameras, or similar, odometry data captured by a movement sensor, such as an IMU (inertial measurement unit) or position sensor, such as a GPS sensor. The agent data can additionally and/or alternatively include derived synthetic data, for example odometry data based on control of the agent, event data from event sensors, such as timing data, or the like. The agent data can include raw data, but may also include processed data, such as a point cloud or similar, derived from sensor data.

In this example, at step 100 the processing device determines a pipeline including a number of nodes, with each node relating to a respective data processing task implemented using a respective software module. The nature of the software modules will vary depending on the preferred implementation, but in one example, the software modules are implemented as plugins, associated with respective interfaces that allow different software modules to communicate and exchange data, as will be described in more detail below.

The nodes are interconnected to define a node sequence representing a sequence of data processing tasks, so that for example, an output from one node is provided as input to a subsequent downstream node, so that data processed by an upstream node can be passed to a downstream node for further processing. In this manner, the data processing to be performed is effectively split into a sequence of tasks with each task being embodied by one or more nodes. Thus, for example, one node might be used to process range data and generate a point cloud, whilst a downstream node could process the point cloud to generate an environment map.

The pipeline can be determined in any suitable manner, and this could involve retrieving an existing pipeline from a database, or other similar repository, for example by having a user select an available pipeline, or could involve creating a new pipeline, for example, by selecting and then interconnecting nodes. It will also be appreciated that a combination of these approaches could be used, for example retrieving and then modifying an existing pipeline. These processes could be manual and/or could be wholly or partially automated. For example, a user might specify details of the data processing to be performed, allowing the processing device to retrieve pipelines that can implement the data processing, so that a user can then select one of the pipelines. Further variations will become apparent from the following description.

At step 110, the processing device determines a node configuration for at least some of the nodes, the node configuration being indicative of one or more configuration options associated with the respective software module. In this regard, some of the nodes may require configuration depending on the nature of the task being performed. For example, if a node is filtering a point cloud, the node might need to be configured to select the particular filtering approach used, the degree of filtering performed, or the like. Typically the configuration options are defined by the node, so when a node is incorporated in a pipeline, the different configuration options are specified, so that a user can review the options and make an appropriate selection.

In this example, at step 120, a processing device, loads software modules corresponding to the nodes in the pipeline. In one example, this process may be facilitated by a node manager, such as a node factory, or other similar application, which can retrieve software modules associated with requested nodes.

At step 130, the nodes, and in particular the software modules of the nodes, are configured in accordance with the node configuration. This process could be performed as the software is retrieved, and may involve setting parameters within the software in accordance with the node configurations specified during the configuration phase.

At step 140, the processing device executes the software modules. This is typically achieved by providing input data to at least one software module using the agent data. The software module performs the respective data processing task, and generates output data, which is then transferred to a next software module in accordance with the node sequence, so that the output data from the software module becomes input data for the next software module. This process is repeated, with agent data and/or processed agent data being passed between the software modules associated with the nodes, based on the node sequence embodied in the pipeline, until output data is provided from one or more software modules as processed agent data.

In practice, the above described process is performed at least in part using messages that are passed between the software modules. An initial message is typically generated, including a payload containing the agent data, as well as any other required information, with this being passed to a software module associated with a first node. The software module performs the relevant processing. Following this, relevant information, such as processed data can then be passed to one or more downstream nodes. This can be achieved by adding processed data to the message payload and then forwarding the message. Additionally and/or alternatively, this may involve amending data within messages, generating additional messages or the like, depending on the preferred implementation, or the nature of the processing performed and/or requirements of downstream nodes. For example, where a downstream node only requires data processed by an upstream nodes, the upstream node might generate a new message only including the processed data, whereas in other scenarios the upstream mode might pass on the original messages and additional messages containing processed data, modifications to the original data, or the like.

Irrespective of how messages are managed, this process is repeated, so that as message(s) are passed down through the nodes in the pipeline, data within the message is updated, so that a final message contains the processed data. In this regard, it will be appreciated that messages may be duplicated with multiple output messages being created in the event that the pipeline includes branches to allow data to be processed in parallel. Similarly, messages can shared across multiple nodes if required.

In one example, the method for processing data can be split into two phases, namely a configuration phase set out in steps 100 and 110 above, in which software is configured to allow the agent data to be processed, and a subsequent execution phase, set out in steps 120 to 140, in which the software is executed to process the agent data. The configuration phase is typically performed to take into account the nature of the agent data, such as the types of sensors deployed on the agent, and the desired processing to be performed, for example, whether the desired output is a point cloud, environment map, or similar. It will be appreciated from this that the configuration phase may only need to be performed a single time, whilst the execution phase could be repeated multiple times, if multiple instances of similar agent data are to be processed in the same way. However, this is not essential, and if the nature of the agent data and/or the processing to be performed vary, the configuration phase may need to be repeated.

In one example, splitting of the process into two phases is facilitated by having the processing device used in the configuration phase generates a configuration file based on the pipeline and node configurations. Specifically, the configuration file defines the nodes embodied by the pipeline, and how these are interconnected, together with any necessary configuration options associated with nodes within the pipeline. This allows the pipeline to be subsequently implemented based solely on the configuration file. In this instance, the processing device used in the execution phase can then retrieve or receive the configuration file parse the file to identify and then load and configure the software modules, allowing the modules to be executed to thereby perform the desired data processing.

However, it will be appreciated that this is not essential, and alternatively the processes of determining and then implementing the pipeline and node configurations could be performed sequentially, allowing the pipeline and nodes to be created and implemented on the fly, without requiring a configuration file to be generated. Following on from this, if used, configuration files can be implemented in a range of different manners. For example, a configuration file could be constructed as a direct specification of all nodes and constructed immediately, meaning it is not stored in any other format and is a "bare-metal" configuration which mingles with the plugins directly. A configuration could be directly supplied to the execution phase from the configuration phase, for example, in the form of command-line arguments, shared-memory, pipes, or the like. The configuration can be static/assumed, so for example, a specific binary might have a configuration for a specific system hard-coded into it that doesn't require knowledge of the state or inspection of the data since it's assumed, so that whilst a pipeline and nodes are used these are not exposed to users.

From this, it will be appreciated that there are a wide range of ways in which the approach could be implemented, and accordingly, throughout the following description, where reference is made to the use of a configuration file, it will be appreciated that this is for the purpose of illustration only and is not intended to be limiting.

In any event, the above described process allows pipelines to be created, which can then be used in processing agent data, for example to perform tasks related to SLAM processes. The use of pipelines in this manner has a number of advantages. For example, it allows a user to create a sequence of processing tasks, without needing to understand how each task is implemented, whilst suitable configuration of software modules associated with the nodes, allows these to be re-used in multiple pipelines. This reduces the complexity of performing data processing tasks.

Additionally, modules that represent different implementations for performing a given task can be interchanged, allowing users to more easily select from different existing known algorithms. For example, a pipeline can be generated for processing range data, generating a point cloud, using the point cloud to generate a map of the event and then import an agent trajectory into the map. Once this pipeline has been created, the actual implementation algorithms used can be easily interchanged by selecting different implementing software modules, so that a user can select whether to use particle filter, extended Kalman filter, covariance intersection, GraphSLAM approaches, or the like. This makes it far easier for a relatively unskilled user to configure and then implement a pipeline for processing agent data.

A number of further features will now be described.

In one example, the agent data includes sensor data from one or more sensors associated with the agent, such as GPS, range sensors, image sensors, LiDAR, IMUs, or the like. The agent data may additionally and/or alternatively include processed data, such as point cloud data of at least part of the environment and/or a map of at least part of the environment, or trajectory data indicative of movement of the agent when traversing at least part of the environment. As previously mentioned, the agent data may also include event data indicative of events, or other derived information, such as timing information, including time stamps of data capture, or similar.

In general, each node includes an interface representing the data processing task in addition to the software module that performs processing of data. In one example, each node can include a single interface, with the interface being associated with multiple different software modules, allowing each node to be implemented in a number of different ways. For example, a point cloud filter node might have an interface, and multiple implementing software modules, such as modules for filtering using a random filter, a range filter or a voxel filter.

In one example, the interface acts as an input configured to receive input data and an output configured to provide output data. In this case, the configuration option can include an input configuration indicative of an input data format and/or input data content, and an output configuration, indicative of an output data format and/or output data content. The interface also acts as a processor configuration defining any configuration required by the software module.

The interface approach allows a user to select a node, knowing this will be capable of being integrated into the pipeline via the interface, with the underlying implementation of the node being alterable, for example depending on other requirements, such as the nature of the agent data, and/or preferred implementation. Thus, having selected a point cloud filter node, the user can then select a software module allowing different implementations of the filtering process to be implemented, without requiring modification to the pipeline.

In one example, the method includes determining a pipeline by determining processing requirements for the agent data and then using the processing requirements to retrieve one of a number of defined pipelines and/or create a pipeline. The processing requirements typically depend on the outcome the user wishes to achieve, for example depending on whether the user wishes to generate a point cloud, environment map, trajectory or the like. It will be appreciated that this will typically need to be assessed manually based on user preferences and requirements. The processing requirements may also be dependent on the nature of the agent data, which in one example, is expressed as a state, which will be described in more detail below.

When creating a pipeline, this is typically achieved by obtaining a number of nodes and then interconnecting the nodes to define the node sequence in accordance with the processing requirements. The connections can be of any appropriate form and could include one to one connections or one to many connections, for example to define branches in which one node is connected to at least two other nodes so that output data from a software module is provided as input data to at least two other software modules.

The nodes are typically obtained by selecting one of a number of existing defined nodes, but alternatively a node could be obtained by creating a node, including creating a new software module for an existing node. For example, this could involve selecting one of a number of available interfaces, each interface representing a data processing task and then generating a software module, such as a plugin accordance with requirements associated with the interface. Thus, the interface will typically define limitations in terms of inputs and outputs, with the software module then being created to meet these requirements. This ensures consistency of the software modules, enabling these to be swapped in and out of pipelines as required, without requiring nodes themselves are altered. It will be appreciated that in the event a software module cannot use an existing interface, a new interface would need to be created.

In one example, the nodes are registered with a node factory, allowing the nodes to be managed in accordance with the principals of class-based programming, with the factory method pattern being a creational pattern that uses factory methods to deal with the problem of creating objects without having to specify the exact class of the object that will be created. This is done by creating objects by calling a factory method—either specified in an interface and implemented by child classes, or implemented in a base class and optionally overridden by derived classes—rather than by calling a constructor. Thus, the node factory is typically responsible for maintaining interfaces, allowing software modules, such as plugins to be created and deployed in the pipelines.

Once a software module has been created and registered, this can then be selected. In this example, the node is selected by selecting one of a number of available interfaces and then selecting one of a number of available software modules associated with the selected interface, each software module being a respective implementation of the data processing task. Again, this is typically performed using the node factory, so the node factory presents details of available interfaces and software modules to the user allowing these to be selected as required.

In terms of creating a pipeline, this can be performed by selecting individual nodes and then interconnecting these as required. More typically however, pipelines can be constructed making use of existing workflows, which represent smaller sequences of data processing tasks. Examples of this include receiving agent data and extracting a trajectory, generating and filtering a point cloud, or the like. In this example, the method can include having the processing device retrieve one or more of a number of defined workflows, each workflow being indicative of a sequence of one or more data processing tasks. Following this, the pipeline can be created using the one or more of the workflows, for example, by having a user specify how the workflows are to be connected to other nodes and/or other workflows. When a workflow is selected, this can be specified in terms of interfaces, in which case once the workflow has been selected, the user will typically select one of a number of available software modules associated each interface.

As mentioned above, in one example, capabilities of agents are represented as an agent state, and this information can be used when creating and/or configuring pipelines. In this example, the method typically includes determining an agent state for the one or more agents. The state is typically indicative of one or more of sensors associated with the agent, a sensor transformation representing a physical geometry of the sensors associated with the agent and one or more trajectory types associated with the agent. This information is typically defined for each agents, for example, when the agent is initially configured.

Having determined the state of one or more agents, this information can be used when selecting nodes, or retrieving defined workflows or pipelines, ensuring these are compatible with the relevant agents. For example, an agent that captures range data using a LiDAR, might need different nodes to an agent that captures stereoscopic images, in order to allow the sensor data to be correctly interpreted. However, both such approaches will typically result in creation of a point cloud, and hence could use similar workflows for point cloud processing.

In addition to information regarding the data processing requirements and the agent state information, additional data requirements might also be required, such details of other required input files, calibration files associated with different sensors, or the like. In this example, such additional data requirements can also be used to select nodes and/or retrieve workflows or pipelines.

The agent state and additional data can be used in combination to configure the pipeline and nodes, and this process can include determining the agent state, for example by receiving an indication of the state from one or more agents, and then retrieving sensor details of the sensors associated with the agent from the agent state. Following this, a pipeline is determined using the sensor details and processing requirements for the agent data. A step of validating additional data requirements are met for the pipeline is then typically performed, ensuring it will be possible to execute the pipeline based on the available data. This is typically performed before the configuration file is generated and/or before the software modules are loaded and executed.

In one example, the software modules are implemented as plugins to the interfaces, with the software modules being loaded dynamically during the execution phase. However, this is not essential and other approaches could be used. For example, statically built systems could be used. This could be achieved using an approach akin to a class/inheritance programming methodology, and/or by using templated/statically compiled structures. This would allow the use of interfaces/re-use, but without the need for base-classes, inheritance, or plugins. By way of an example, a pointcloud filtering node could use a class for each filter type (Voxel, Random) and invoke the class, or could use a function/method for each filter type and invoke the function as defined by the configuration. These effectively provide function-level interfaces so a class/plugin doesn't need to be used.

In one example, nodes are implemented using a node factory, with the node factory implementing a selected node by determining the node configuration for a selected node from the configuration file, and then converting the configuration into a specification in accordance with a converter supplied by the selected node. The node is then initialised, by loading the software module, before the specification is provided to the node, to allow the node to configure internal processes. Once this has been completed, the node factory is able to provide the constructed node, allowing this to be used within the pipeline. It will be appreciated however that this process is not essential and other techniques for implementing software modules could be used.

In one example, during execution, data is transferred between software modules using messages. Each message includes a header containing pipeline data indicative of a capture time of the sensor data, the agent that captured the sensor data, and a frame. The message also includes a payload containing the sensor data, any processed sensor data and the output data from a previous software module. Thus, it will be appreciated that as the message is passed through the pipeline, each node will perform any relevant process and add processed data into the message, update data within the message and/or generate new messages, allowing the original sensor data and/or any processed data from previous nodes to be passed to downstream nodes so this can be used as required. Meanwhile, the header allows the nodes to track the data they are processing, ensuring that data is processed correctly, for example if processing data across multiple messages.

The nodes can be configured to provide a wide range of different functionality, including, but not limited to functionality such as performing calibration, for example calibrating extrinsics, such as the pose or timing of a series of sensors in one or more systems, or calibrating intrinsics, such as bias or sensor-errors, of a series of sensors in one or more systems. Other functionality includes processing sensor data, generating a point cloud, generating maps, including floor plans, heightmaps, BIM models, Bathymetry or photogrammetry, or similar, generating a sensor trajectory within an environment, translating data between different reference frames, converting data between different formats, performing filtering, or the like. It will also be understood that the functionality could include performing any part or whole simultaneous mapping and localisation process and/or generating a simultaneous mapping and localisation process output.

Figure 2:
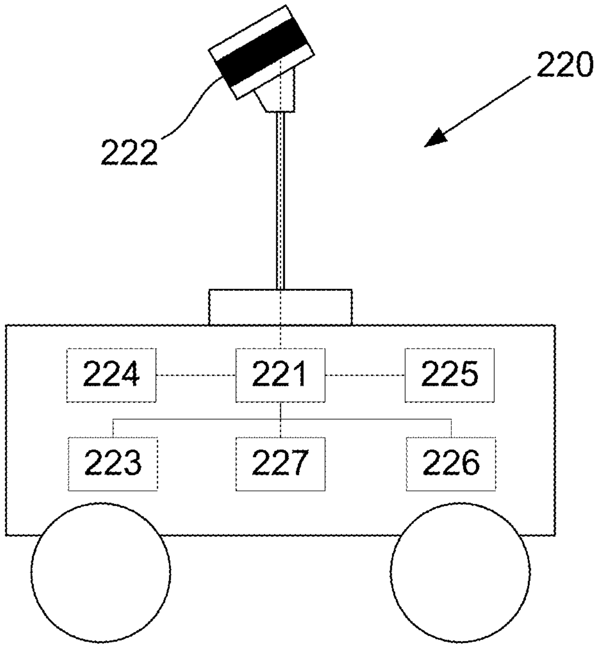
FIG. 2 is a schematic diagram of an example of an agent.

In one example, the agents include autonomous vehicles and an example agent is shown in more detail in FIG. 2.

In this example, the agent 220 includes at least one electronic processing device 221 located on-board a mobile platform, such as ground vehicle, which is coupled to a mapping system 222 configured to perform scans of the environment surrounding the vehicle in order to build up a 3D map (i.e. point cloud) of the environment. In one example, the mapping system includes a 3D LiDAR sensor such as a VLP-16 3D LiDAR produced by Velodyne.

The processing device 221 is also coupled to an inertial sensing device 223, such as an IMU (inertial measurement unit), a control system 224 to allow movement of the agent to be controlled, and one or more other sensors 225. This could include proximity sensors for additional safety control, or an imaging device, or similar, to allow images of the environment to be captured, for example, for the purpose of colourising point cloud representations of the environment.

The processing device 221 can also be connected to an external interface 226, such a wireless interface, to allow wireless communications with other agents, for example via one or more communications networks, such as a mobile communications network, 4G or 5G network, WiFi network, or via direct point-to-point connections, such as Bluetooth, or the like.

The electronic processing device 221 is also coupled to a memory 227, which stores applications software executable by the processing device 221 to allow required processes to be performed. The applications software may include one or more software modules, and may be executed in a suitable execution environment, such as an operating system environment, or the like. The memory 227 may also be configured to allow mapping data and frame data to be stored as required, as well as to store any generated map. It will be appreciated that the memory could include volatile memory, non-volatile memory, or a combination thereof, as needed.

It will be appreciated that the above described configuration assumed for the purpose of the following examples is not essential, and numerous other configurations may be used. For example, although the agent is shown as a wheeled vehicle in this instance, it will be appreciated that this is not essential, and a wide variety of agents could be used, including UAVs, or the like.

Figure 3:
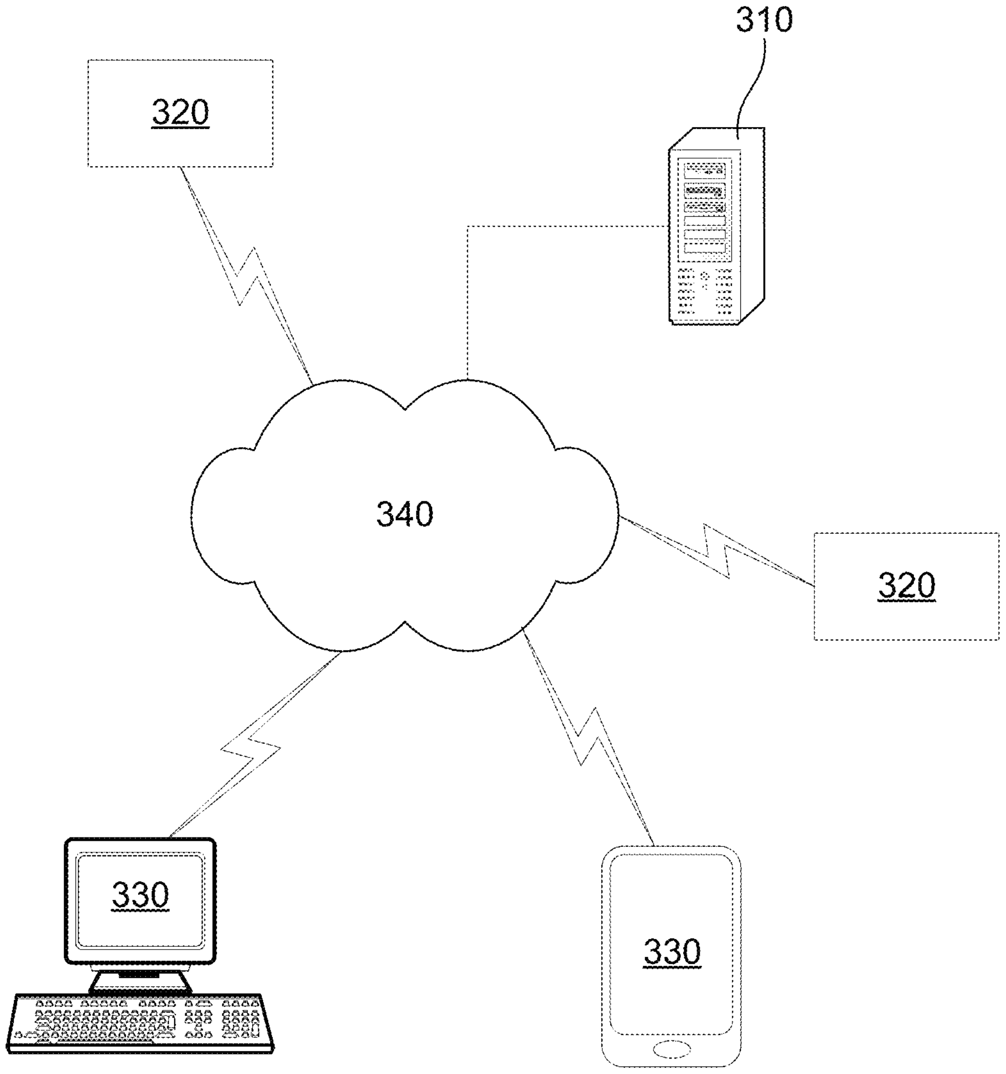
FIG. 3 is a schematic diagram of a specific example of a system for processing agent data.

A specific example of a system for processing agent data will now be described in more detail with reference to FIGS. 3 to 5.

In this example, the system includes a number of agents 320, client devices 330 and one or more processing systems 310, such as one or more servers, in communication via one or more communications networks 340. It will be appreciated that the configuration of the networks 340 are for the purpose of example only, and in practice the agents 320, client devices 330 and one or more processing systems 310 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

Whilst the processing system 310 is shown as a single entity, it will be appreciated that in practice the processing system 310 can be distributed over a number of geographically separate locations, for example as part of a cloud-based environment. However, the above described arrangement is not essential and other suitable configurations could be used.

Figure 4:
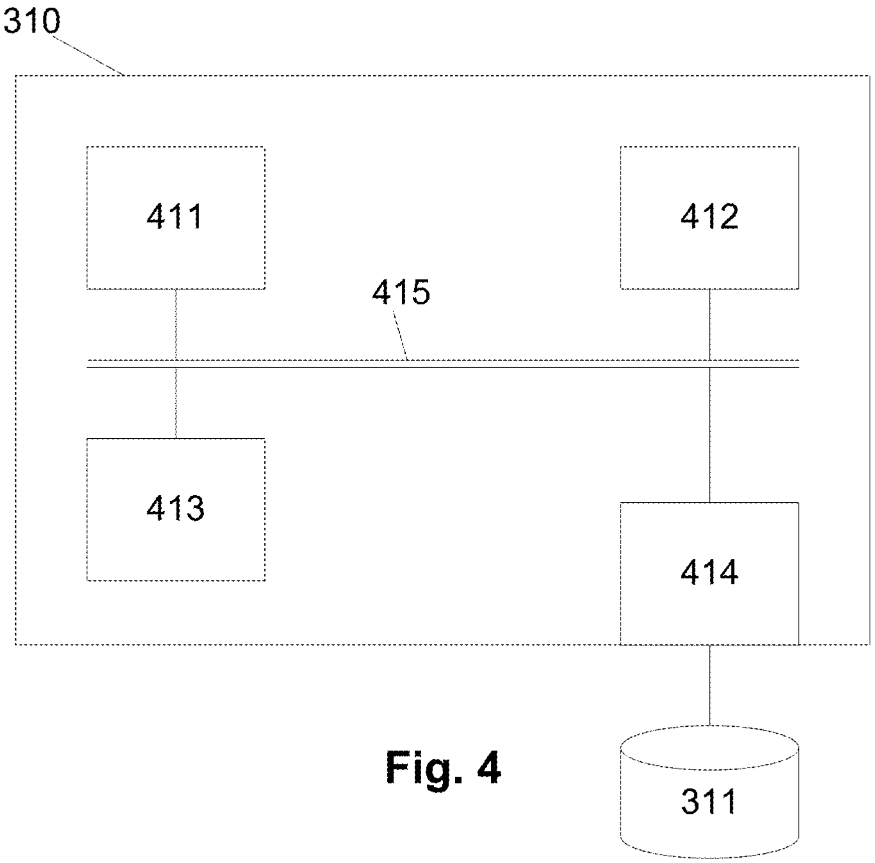
FIG. 4 is as schematic diagram of an example of a processing system.

An example of a suitable processing system 310 is shown in FIG. 4. In this example, the processing system 310 includes at least one microprocessor 411, a memory 412, an optional input/output device 413, such as a keyboard and/or display, and an external interface 414, interconnected via a bus 415 as shown. In this example, the external interface 414 can be utilised for connecting the processing system 310 to peripheral devices, such as the communications networks 340, databases, other storage devices, or the like. Although a single external interface 414 is shown, this is for the purpose of example only, and in practice multiple interfaces using various methods (e.g. Ethernet, serial, USB, wireless or the like) may be provided.

In use, the microprocessor 411 executes instructions in the form of applications software stored in the memory 412 to allow the required processes to be performed. The applications software may include one or more software modules, and may be executed in a suitable execution environment, such as an operating system environment, or the like.

Accordingly, it will be appreciated that the processing system 310 may be formed from any suitable processing system, such as a suitably programmed client device, PC, web server, network server, or the like. In one particular example, the processing system 310 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 5:
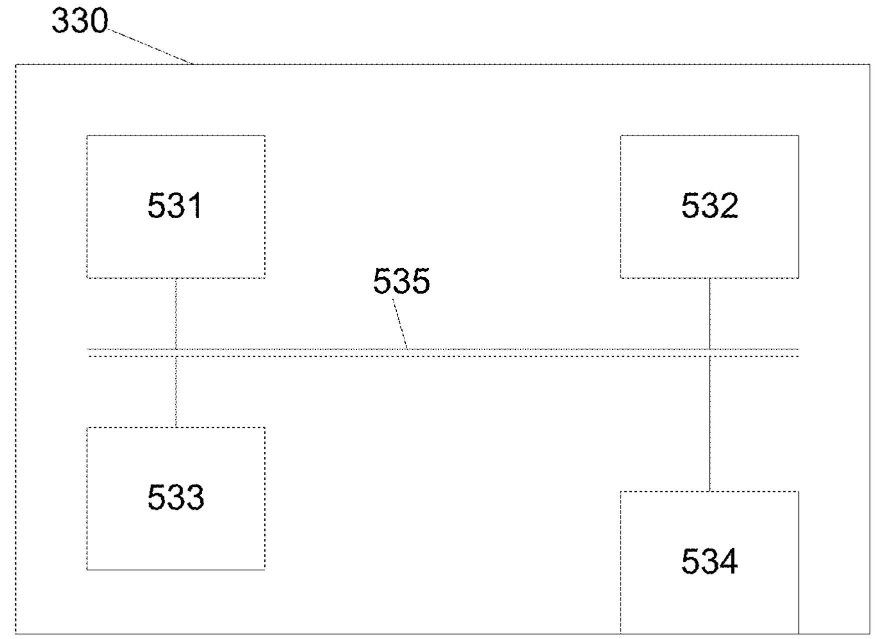
FIG. 5 is a schematic diagram of an example of a client device.

As shown in FIG. 5, in one example, the client device 330 includes at least one microprocessor 531, a memory 532, an input/output device 533, such as a keyboard and/or display, and an external interface 534, interconnected via a bus 535 as shown. In this example the external interface 534 can be utilised for connecting the client device 330 to peripheral devices, such as the communications networks 340, databases, other storage devices, or the like. Although a single external interface 534 is shown, this is for the purpose of example only, and in practice multiple interfaces using various methods (e.g. Ethernet, serial, USB, wireless or the like) may be provided.

In use, the microprocessor 531 executes instructions in the form of applications software stored in the memory 532 to allow for communication with the processing system 310, as well as to allow user interaction for example through a suitable user interface.

Accordingly, it will be appreciated that the client devices 330 may be formed from any suitable processing system, such as a suitably programmed PC, Internet terminal, laptop, or hand-held PC, and in one preferred example is either a tablet, or smart phone, or the like. Thus, in one example, the client device 330 is a standard processing system such as an Intel Architecture based processing system, which executes software applications stored on non-volatile (e.g., hard disk) storage, although this is not essential. However, it will also be understood that the client devices 330 can be any electronic processing device such as a microprocessor, microchip processor, logic gate configuration, firmware optionally associated with implementing logic such as an FPGA (Field Programmable Gate Array), or any other electronic device, system or arrangement.

For the purpose of the following examples, it is assumed that one or more processing systems 310 are servers, which communicate with the client devices 330 and agents 320 via a communications network, or the like, depending on the particular network infrastructure available. The servers 310 typically execute applications software for performing required tasks including storing, searching and processing of data, with actions performed by the servers 310 being performed by the processor 411 in accordance with instructions stored as applications software in the memory 412 and/or input commands received from a user via the I/O device 413, or commands received from the client device 330.

It will also be assumed that the user interacts with the client device 330 via a GUI (Graphical User Interface), or the like presented on a display of the client device 330, and in one particular example via a browser application that displays webpages, or an App that displays relevant information. Actions performed by the client devices 330 are performed by the processor 531 in accordance with instructions stored as applications software in the memory 532 and/or input commands received from a user via the I/O device 533.

However, it will be appreciated that the above described configuration assumed for the purpose of the following examples is not essential, and numerous other configurations may be used. For example, for the purpose of these examples, it is assumed that the majority of actions are performed by the server 310, with the client device 330 largely acting as an I/O device, to allow user interaction with the server 310, but it will be appreciated that this partitioning of functionality between the client devices 330, and the servers 310 may vary, depending on the particular implementation.

Figure 6:
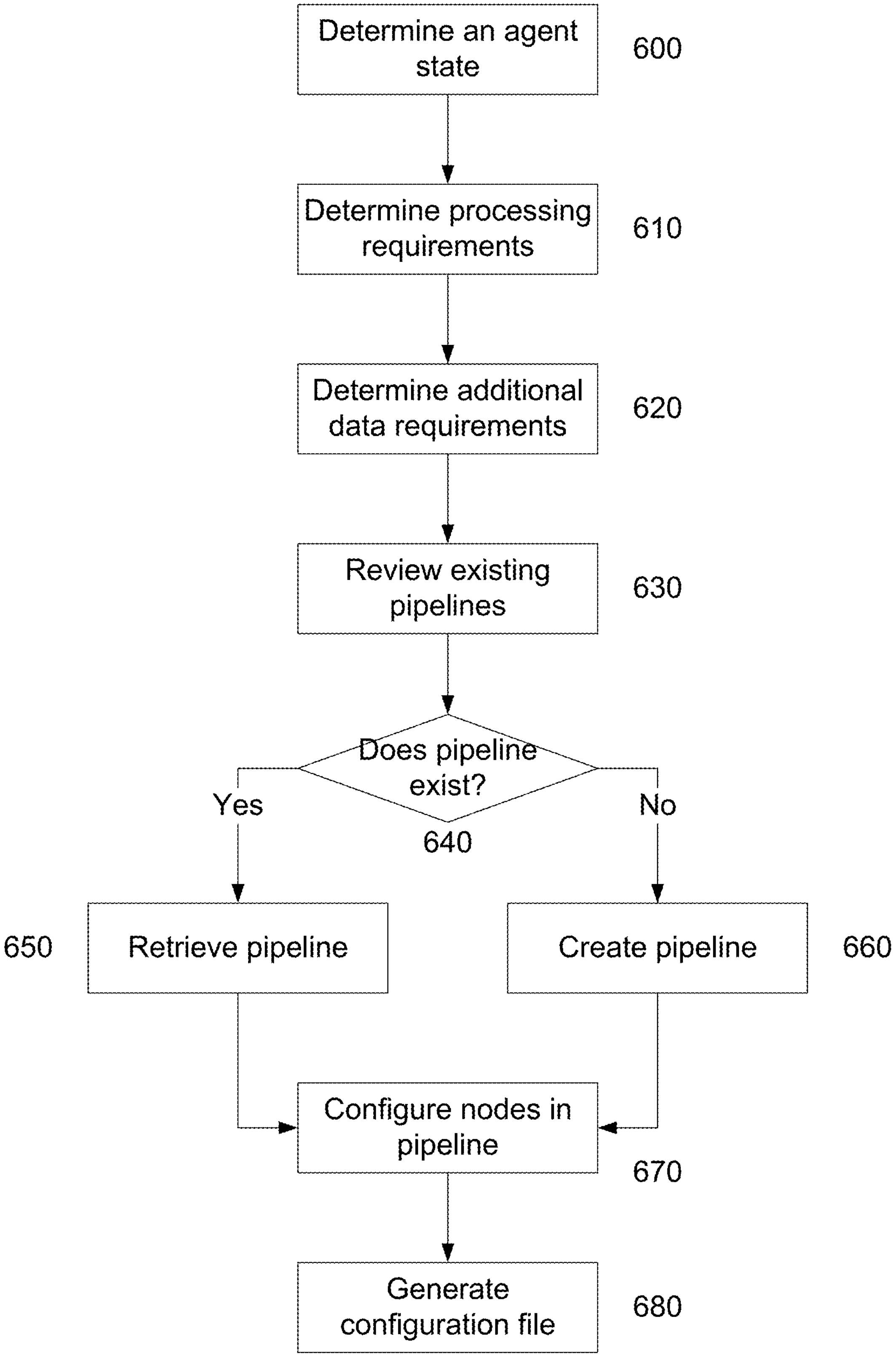
FIG. 6 is a flow chart of an example of the process for determining a pipeline.

An example process for processing agent data will now be described with reference to FIG. 6.

In this example, at step 600 an agent state is determined, typically by having the server 310 receive information regarding the agents 320 from which data is to be received, and then using this information to generate the agent state. The agent state represents the collection of transforms and sensors of an agent, and includes the trajectories associated with the agent and if any are being optimised etc. The parameters used for optimization such as extrinsic/intrinsic calibrations are also contained in the agent state. The agent states can be obtained based on information received from the agents 320, or alternatively could be based on information supplied by the user via the client device 330.

Figure 7A:
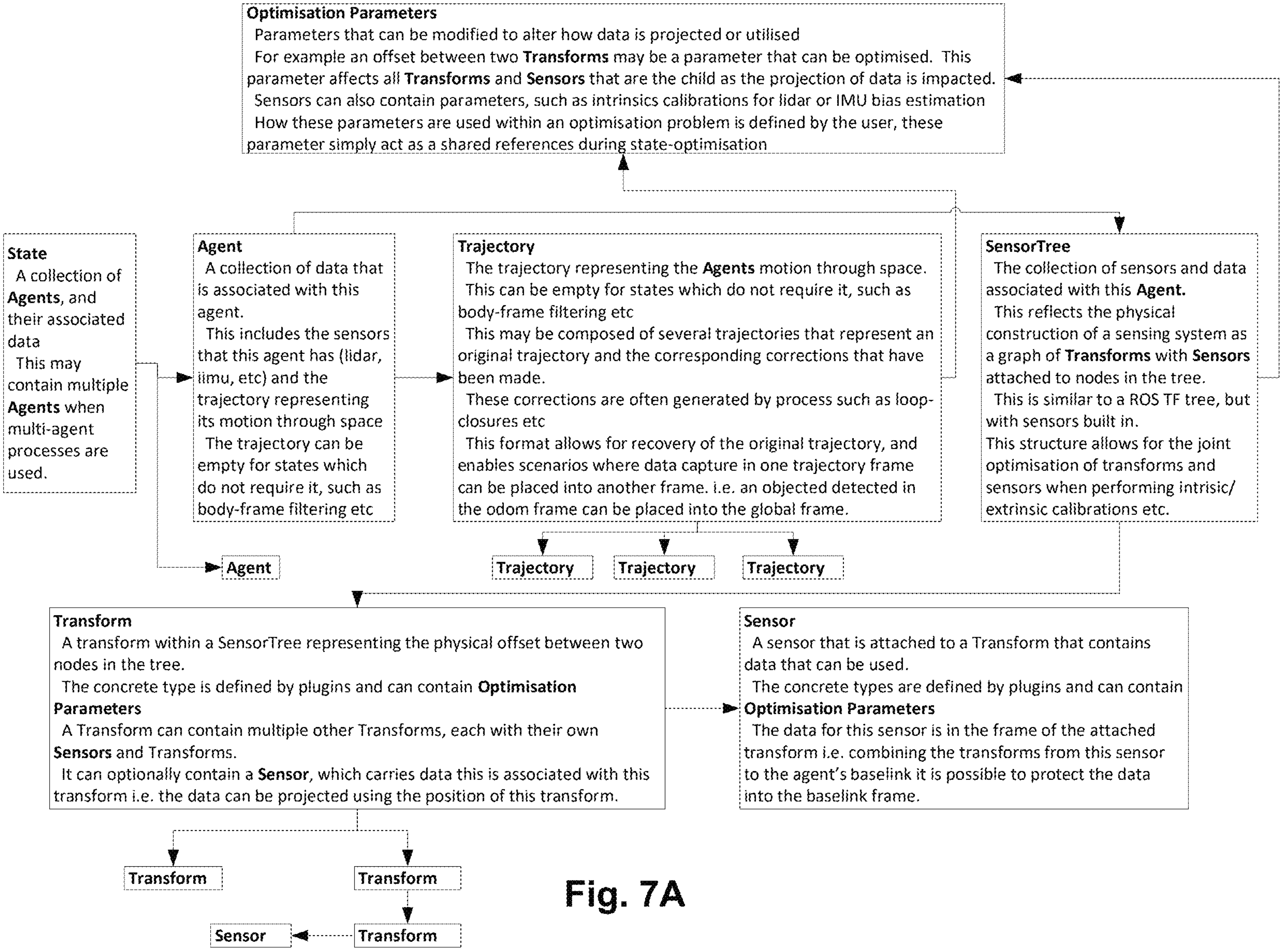
FIG. 7A is a schematic diagram of an example of an overview of a state.
Figure 7B:
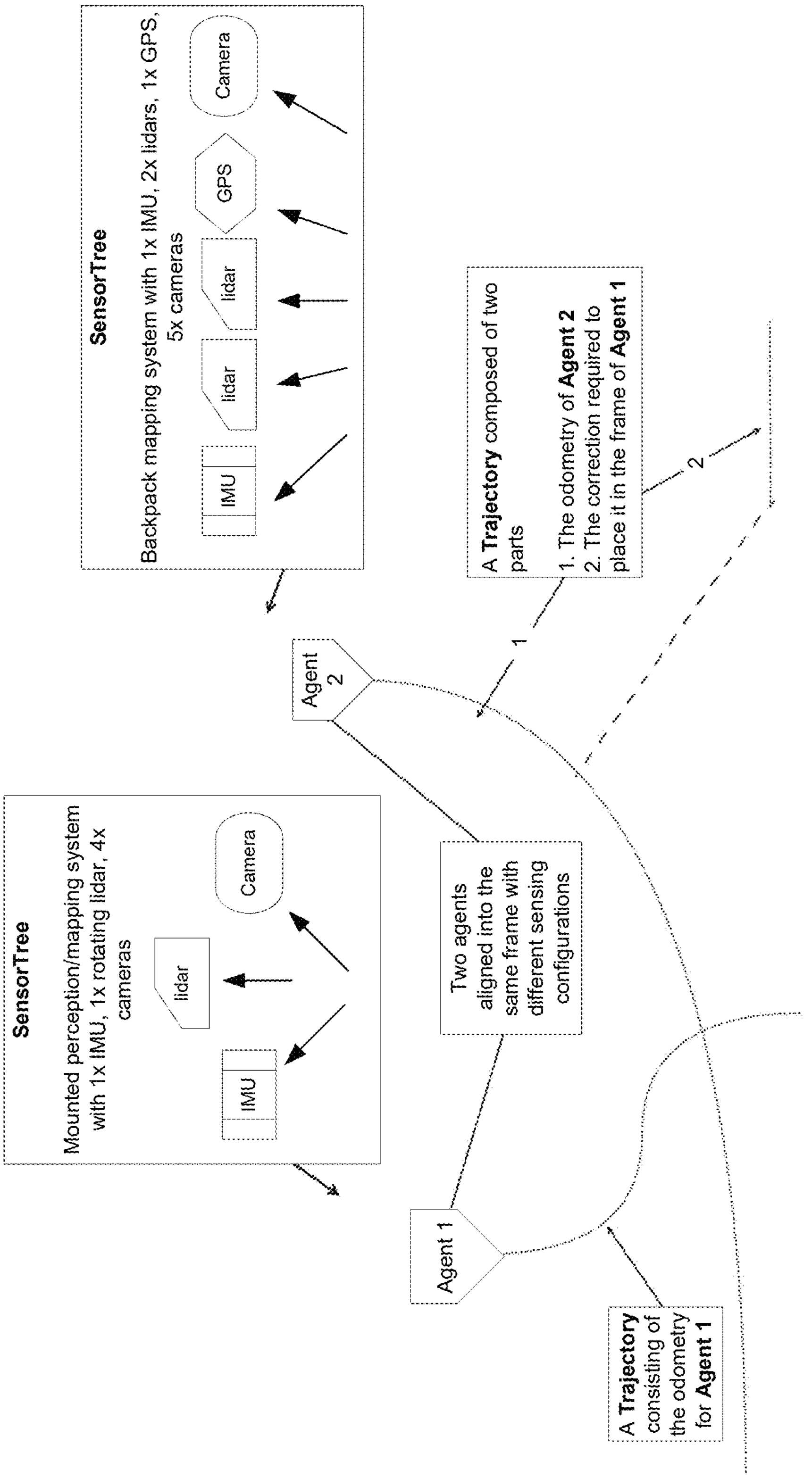
FIG. 7B is a schematic diagram of an example of a specific example of a state incorporating two agents.

A schematic representation of the agent state is shown in FIG. 7A, highlighting the agent state contains information regarding each of the agents 320, the sensors and their arrangement, in the form of a sensor tree and transformations between the sensors. The agent state also includes optimization parameters for each agent, and information regarding the agent trajectory, which might be generated by the agent, and/or derived from sensor data using the pipeline. An illustrative example of the agent state for an example scenario with two agents is shown in FIG. 7B.

At step 610, the server 310 determines processing requirements, with this process typically being performed at least partially manually based on the outcome the user is seeking to achieve. This could be performed by having a user specify actions they wish to perform, such as generating a point cloud, map of an environment, or similar, and in one example, this can be performed by having the user select from a list of available data processing requirements retrieved from the server 310 and presented on the client device, although this is not essential, and this could be performed in any appropriate manner.

At step 620, the server 310 determines additional data requirements, such as details of any required calibration files, or the like. It will be appreciated that this information could be ascertained using information regarding the sensors associated with the agents from the agent state, or the like, so for example a look-up could be performed based on the agent state allowing details of the additional data requirements to be determined.

At step 630, the server 310 uses the agent state, processing requirements and additional data requirements to review existing pipelines that have previously been created and see if any of these are applicable. It will be appreciated that this process could be automated and/or might be manual. For example, the server 310 could present the user with a list of available pipelines, optionally filtering these based on the agent state, processing requirements and additional data requirements, allowing the user to select a pipeline that is applicable. If an available pipeline exists at step 640, this can be selected and retrieved at step 650, otherwise a new pipeline needs to be created at step 660, as will be described in more detail below.

Once a suitable pipeline has been selected or created, at step 670, nodes within the pipeline are configured. This is typically performed in accordance with user input, for example, by having the server 310 present different options associated with each of the nodes, allowing a user to select a relevant option. For example, in the case of a node for filtering a point cloud, the options could include selecting a different filtering algorithm, for example by selecting a respective node plugin, as well as setting filtering parameters.

Once the nodes are configured, at step 680, the server 310 can generate a configuration file, allowing the pipeline to be subsequently implemented.

Figure 8:
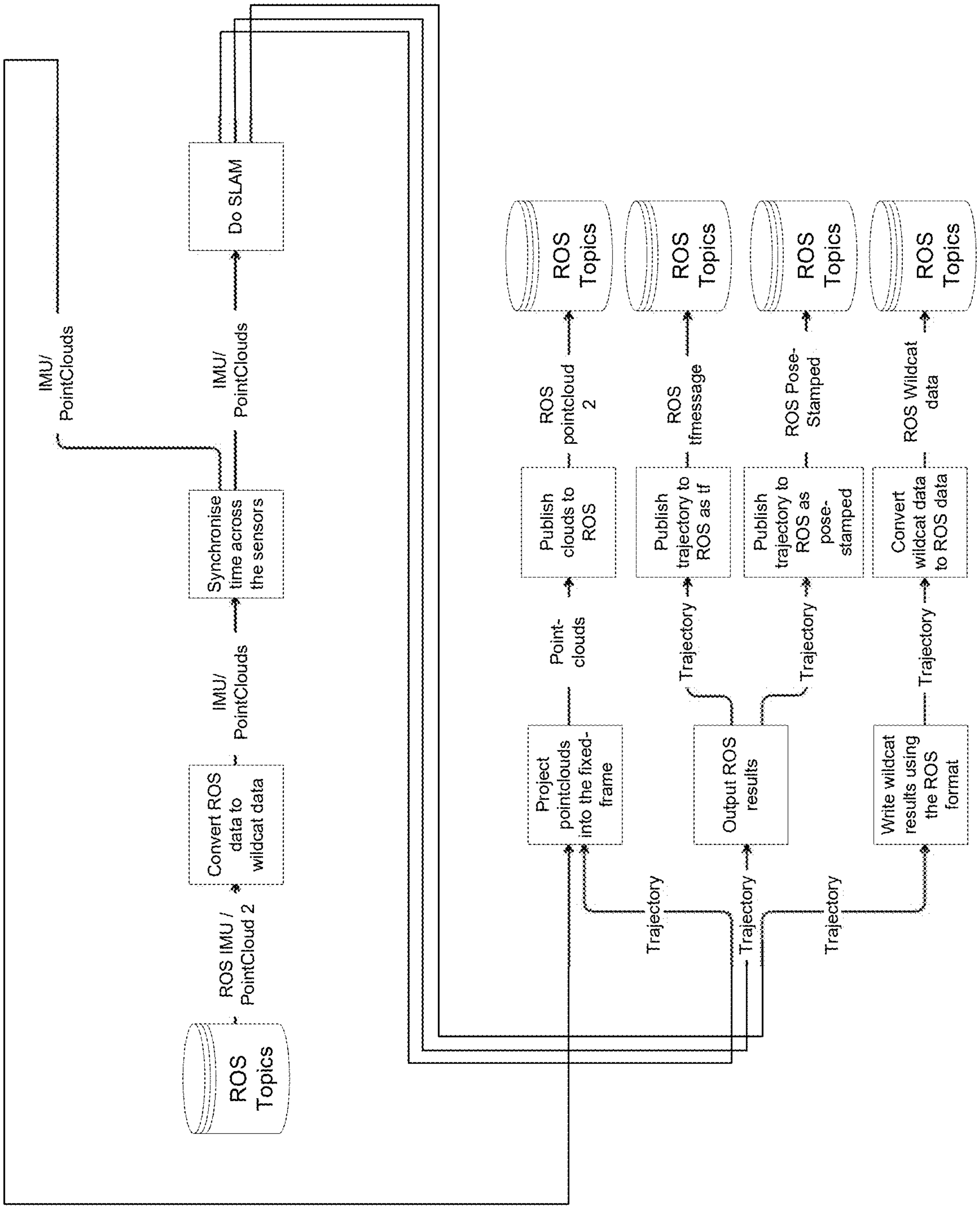
FIG. 8 is a schematic diagram of an example of a pipeline.
Figure 9:
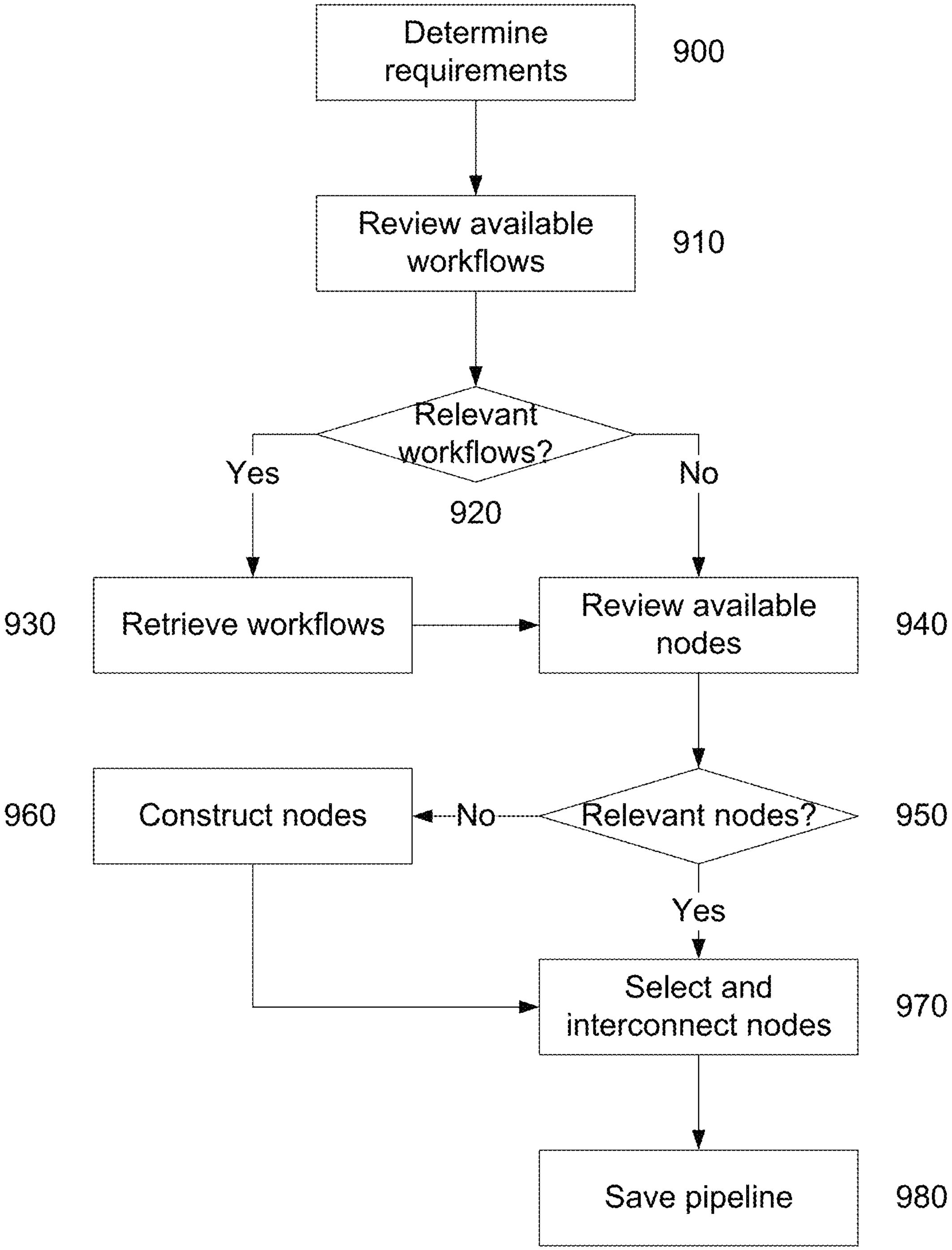
FIG. 9 is a flow chart of an example of the process for constructing a pipeline.

An example of a pipeline is shown in FIG. 8, showing how nodes representing respective data processing tasks are interconnected to define a sequence of data processing tasks. The process for constructing such a pipeline will now be described with reference to FIG. 9.

Figures 10A, 10B:
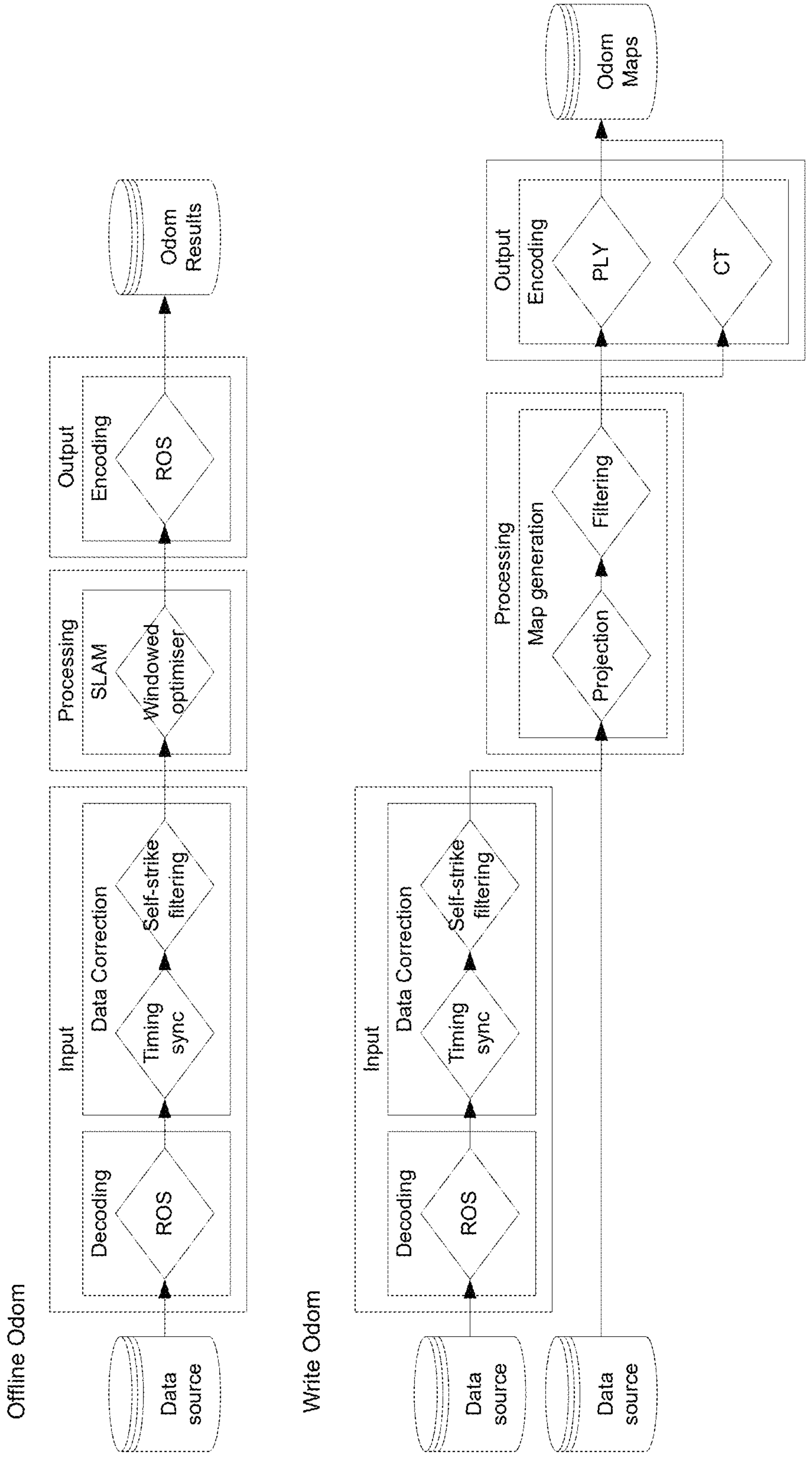
Figure 10E:
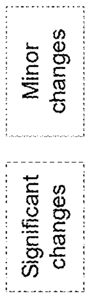
Figure 10E:
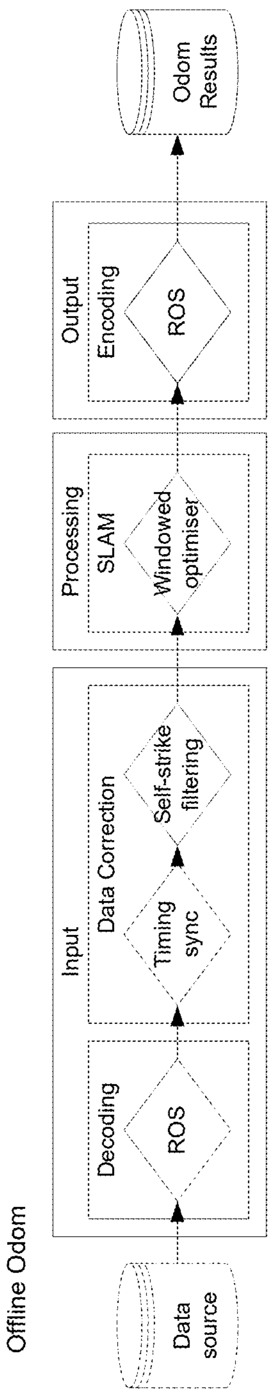
Figure 10F:
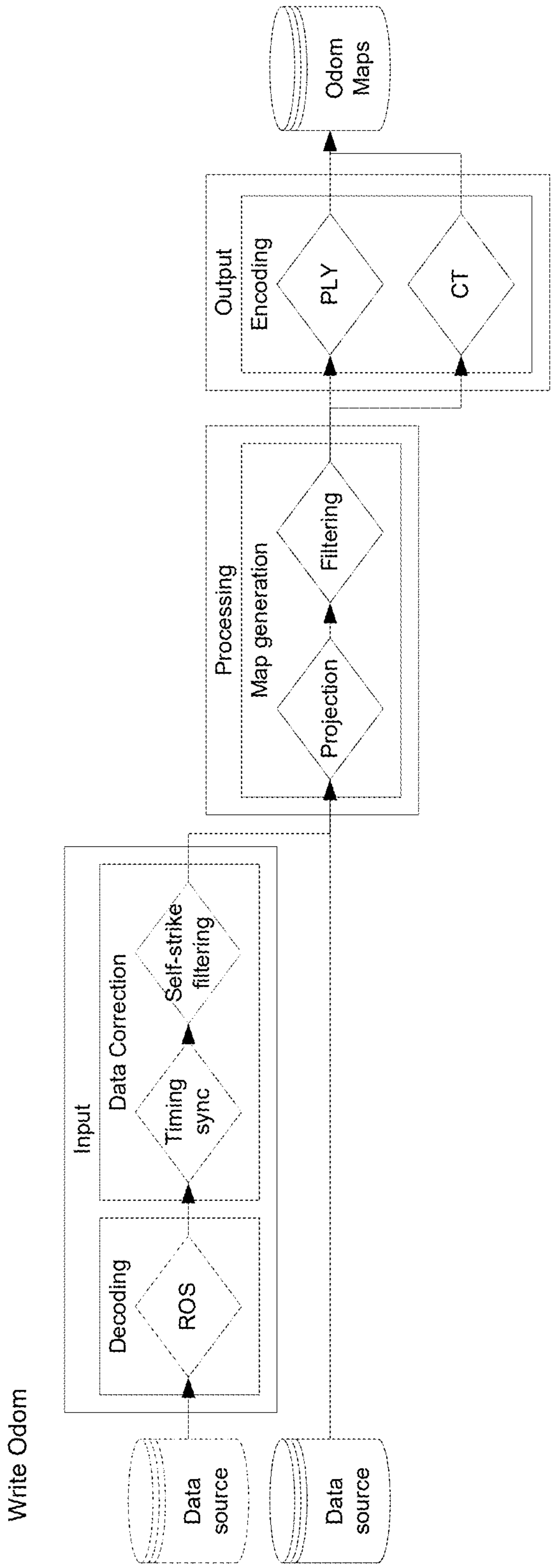
Figure 10G:
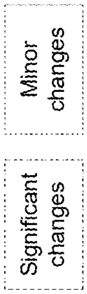
Figure 10H:
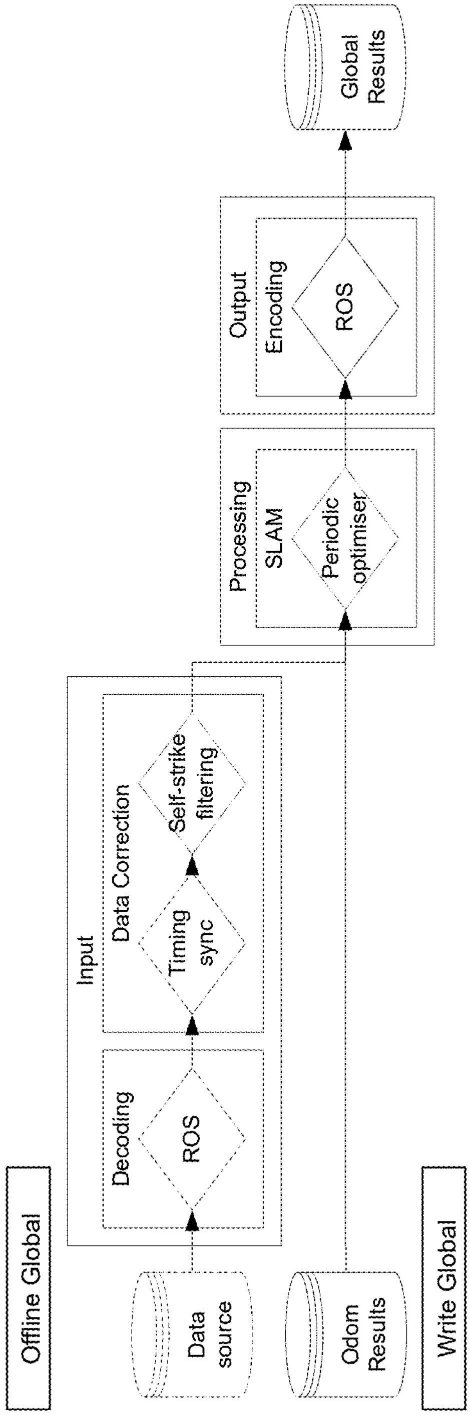
Figure 10H:
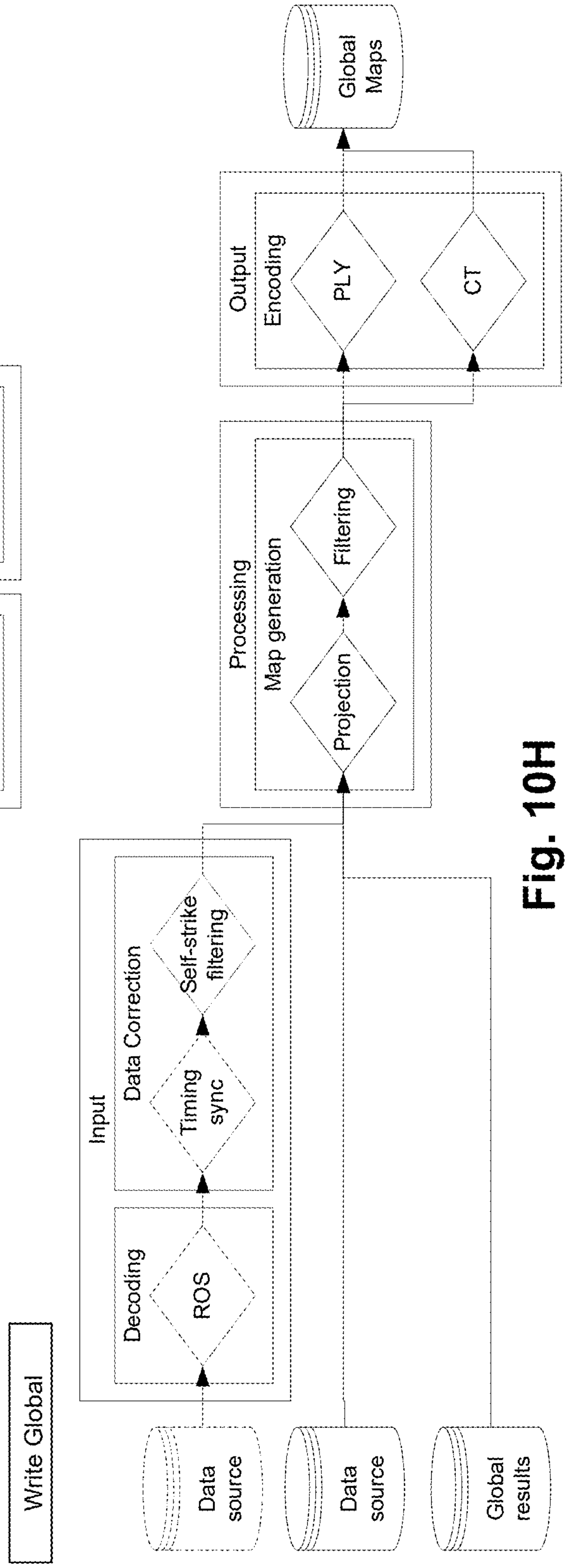

In this example, at step 900 available workflows are retrieved using the agent state, processing requirements and additional data requirements, as previously determined in steps 600 to 620. The workflows represent frequently performed tasks that are made of one or more nodes that can be used across pipelines. Examples of these are shown in FIGS. 10A to 10H, which show pipelines with duplicated workflows in subsequent pipelines being shown in grey. Thus, FIG. 10A represents an offline odometry pipeline, with the input workflow being used in subsequent pipelines. It will be appreciated from this that a repository of workflows can be established and re-used across multiple pipelines, thereby vastly reducing the effort required in constructing new pipelines.

In the event that relevant workflows are identified at step 920, these can be retrieved at step 930. Following this or otherwise, available nodes can be retrieved and reviewed in a similar manner at step 940, allowing the user to determine if there are relevant nodes required to implement any remaining functionality not implemented through the workflows. If it is determined that relevant nodes are not available at step 950, a new node must be constructed at step 960, as will be described in more detail below.

Otherwise, once required workflows and/or nodes have been selected at step 970, these can be interconnected to define the pipelines at step 980. It will be appreciated that this could be achieved in any suitable manner, and may involve using a graphical user interface including representations of nodes similar to those shown in FIGS. 10A to 10H, allowing a user to graphically draw connections. Alternatively, this might be achieved logically by specifying connections between the outputs of upstream nodes and the inputs of downstream nodes.

In one example, the process of selecting nodes, workflows or pipelines, and then generating a configuration file can be facilitated using a configuration manager.

Figure 11A:
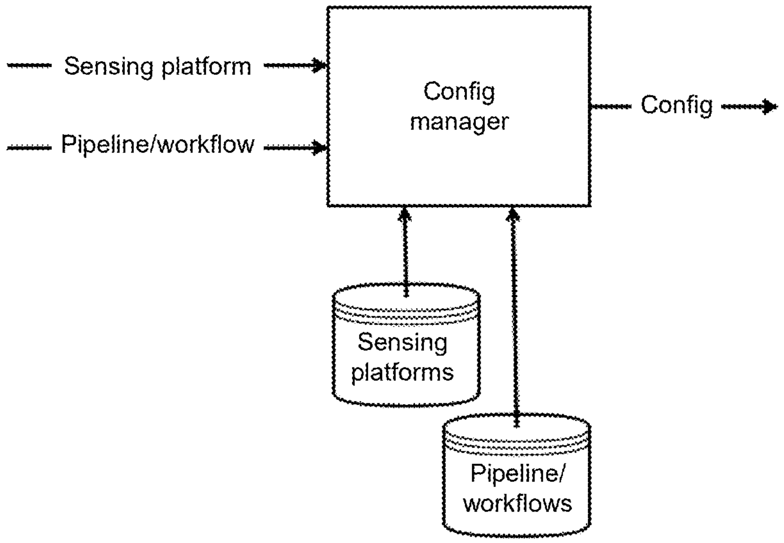
FIGS. 11A to 11C are schematic diagrams of example configuration managers.
Figure 11B:
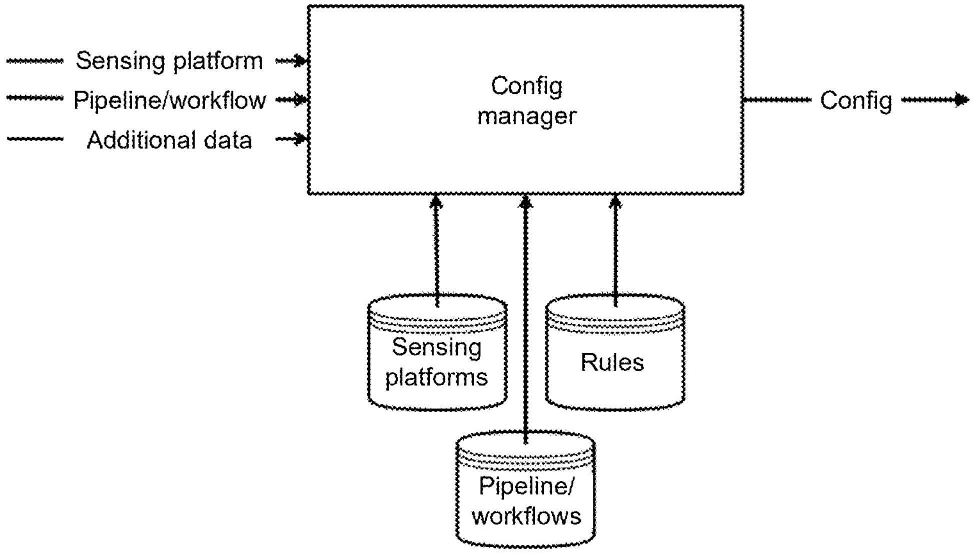
Figure 11C:
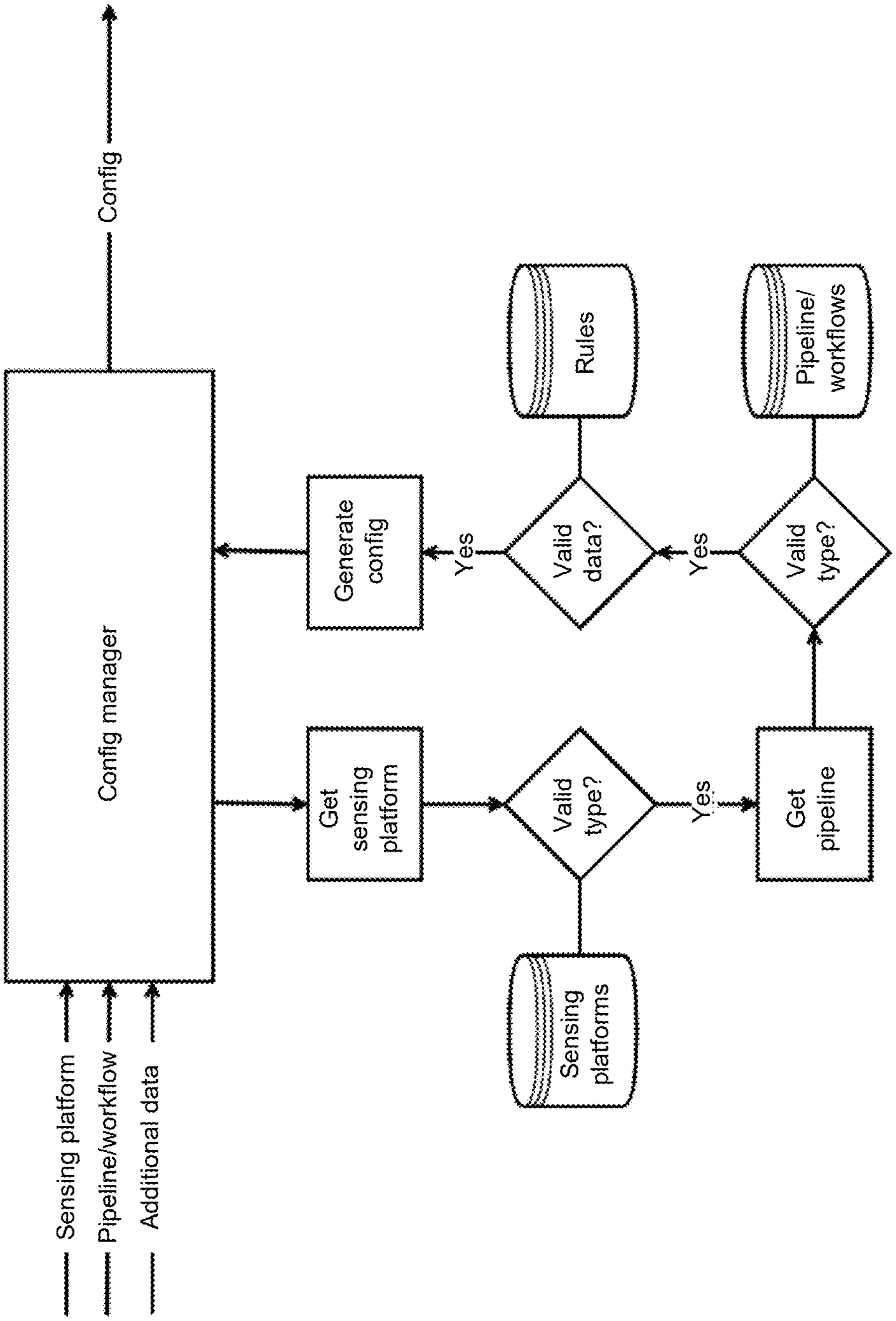

A basic configuration manager is shown in FIG. 11A. In this example, the configuration manager takes information regarding the sensing platform and pipeline/workflows as input, and generates a configuration file. In the example of FIG. 11B, additional complexity is added by introducing potential file system operations and additional mutations of pipelines/workflows. A potential process for selecting pipelines, nodes and workflows becomes as shown in FIG. 11C. This can be used to provide a sensing platform abstraction that generates pipelines given a supplied type, checking if the supplied data is valid, and generates pipelines from pre-configured workflows when possible.

Figure 12A:
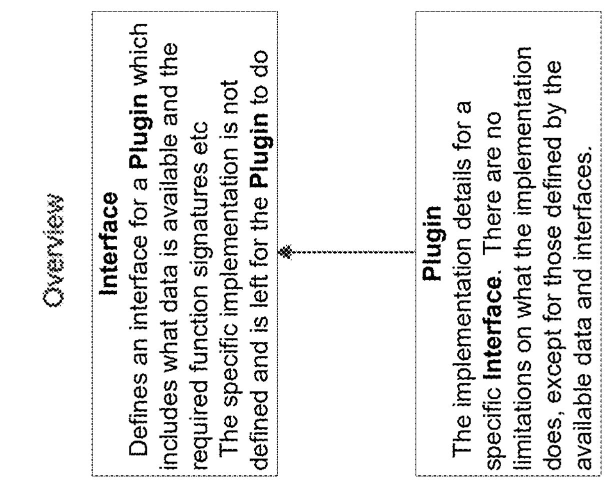
FIG. 12A is a schematic diagram of an example of a node structure.
Figure 12B:
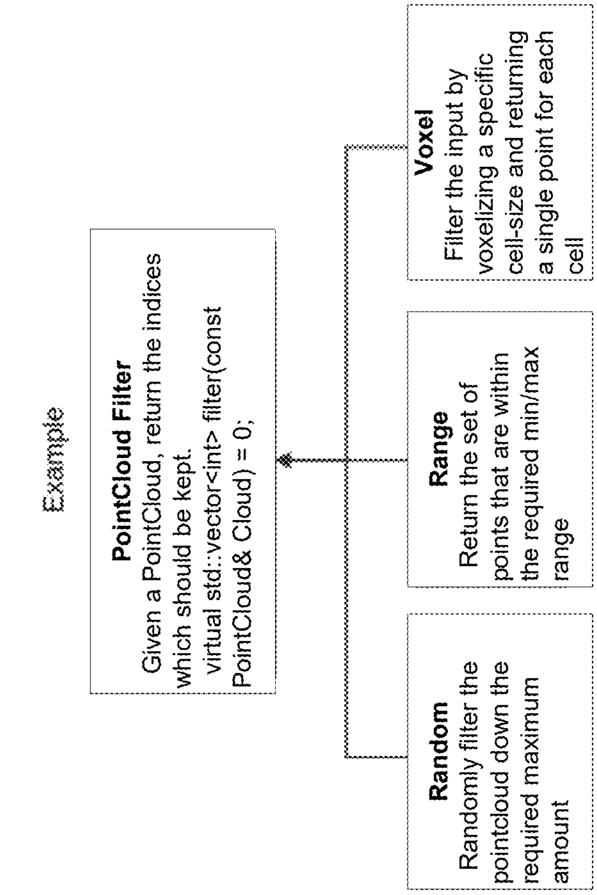
FIG. 12B is a schematic diagram of an example of a node incorporating three node plugins.

As previously mentioned, nodes typically consist of an interface and associated software module in the form of a plugin, as shown in FIG. 12A. In practice, nodes can be implemented using multiple different plugins, as shown in FIG. 12B, so that the node interface represents the functionality provided by the node, whilst the plugin represents the particular implementation. So, in the example of FIG. 12B, the node provides the functionality of a point cloud filter, whilst the plugins represent random, range and voxel filtering mechanisms. This allows a pipeline to incorporate a node to provide certain functionality, with the implementation being governed by selection of a particular plugin during configuration of the node.

Figure 13:
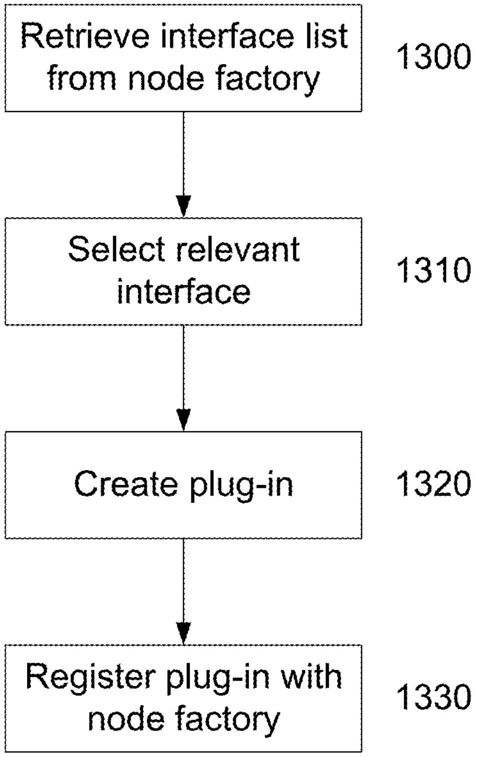
FIG. 13 is a flow chart of an example of the process for creating a node plugin.

In one example, nodes are managed using node factories, to allow for the creation of objects without requiring knowledge of the underlying type. The process for constructing a node plugin will now be described with reference to FIG. 13.

In this example, when a user wishes to create a plugin to expand existing node functionality, the server retrieves a list of interfaces from the node factory at step 1300, allowing the user to select a relevant interface at step 1310. The plugin is then created at step 1320 and registered with the node factory at step 1330.

Figure 14:
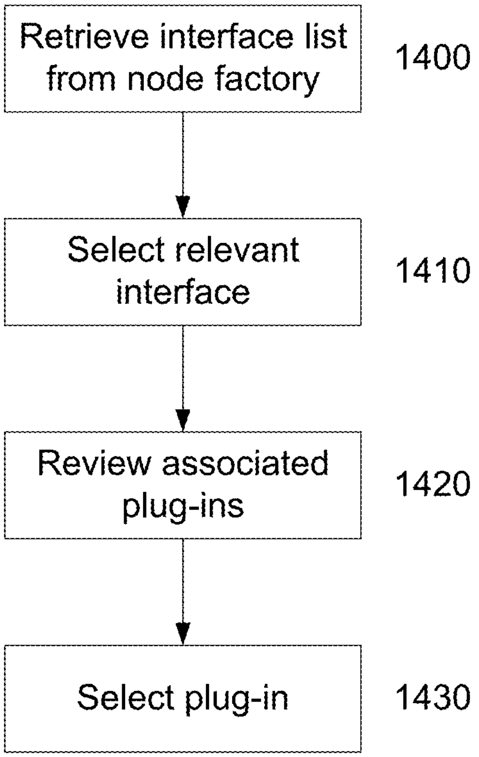
FIG. 14 is a flow chart of an example of the process for selecting a node plugin.

Similarly, as shown in FIG. 14, when configuring a node, the server retrieves a list of interfaces from the node factory at step 1400, allowing the user to select a relevant interface at step 1410. The node factory then provides a list of available plugins at step 1420, allowing the user to select a desired plugin at step 1430.

The use of factories in this manner allows for a number of usages including:

- De-serialising objects from byte-streams into concrete types using type information embedded in the stream
- Constructing configuration-less plugins using a UUID (universally unique identifier), such as the method used to parse command-line arguments
- Constructing plugins using a UUID and collection of configuration parameters for the plugin All of these follow the same basic pattern, namely that the concrete type is not known at compile-time and the user/creator does not know what the concrete type is, only the interface is immediately known.

Figure 15:
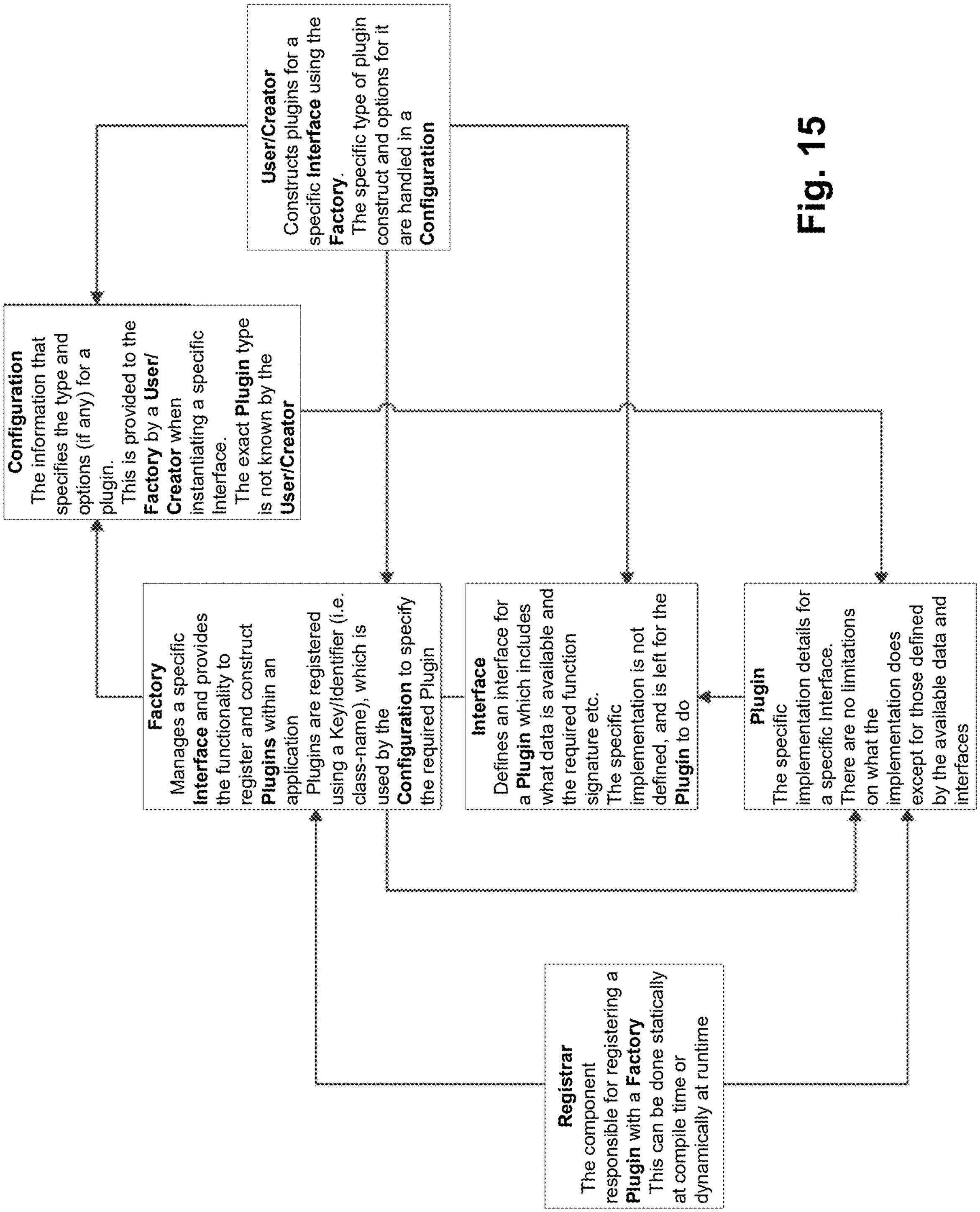
FIG. 15 is a schematic diagram of an example of functionality of a node factory; and, FIGS. 16A and 16B are a flow chart of an example of the process of implementing a pipeline.

Using factories to create plugins requires several components that manage and expose the required information to allow for effective and extendable use, and this relationship is shown in more detail in FIG. 15.

Specifically, the components include:

- a registrar that is a component responsible for registering a plugin with a factory, either statically at compilation time or dynamically at runtime;
- a plugin that provides implementation details for a specific interface and which is only limited by the scope of the interface;
- an interface that defines what data is available and the required function signatures;
- a factory that manages a specific interface and provides functionality to register and construct plugins using a key/identifier;
- a configuration that specifies the type and options associated with a plugin and is provided to the factory by a creator when instantiating an interface; and,
- a creator that constructs the plugins using the factory.

Figure 16A:
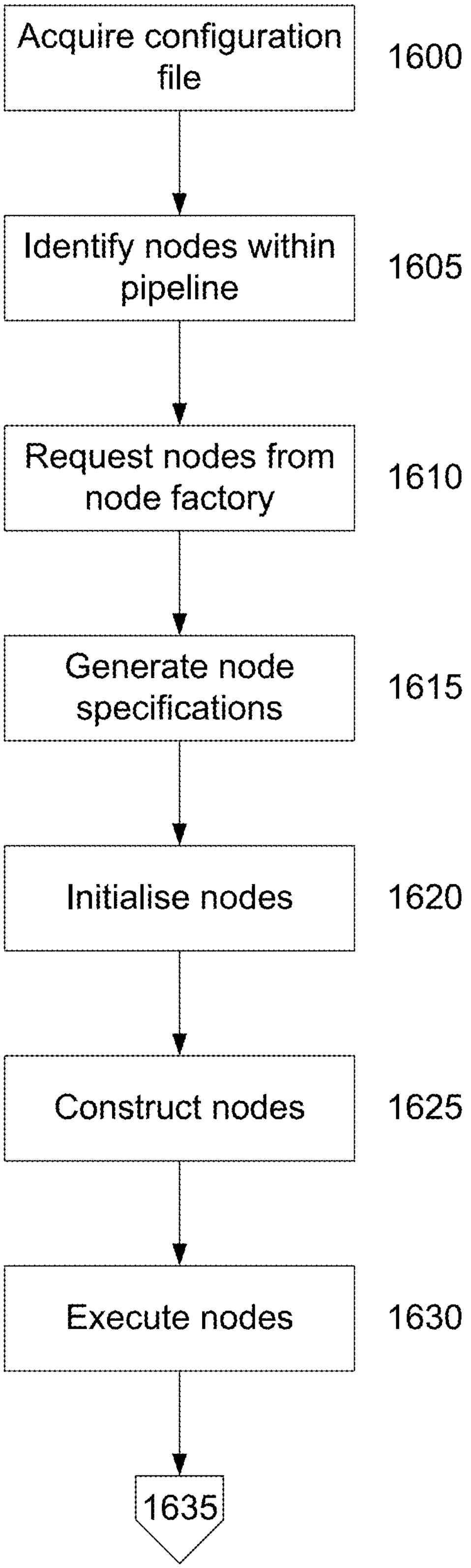
Figure 16B:
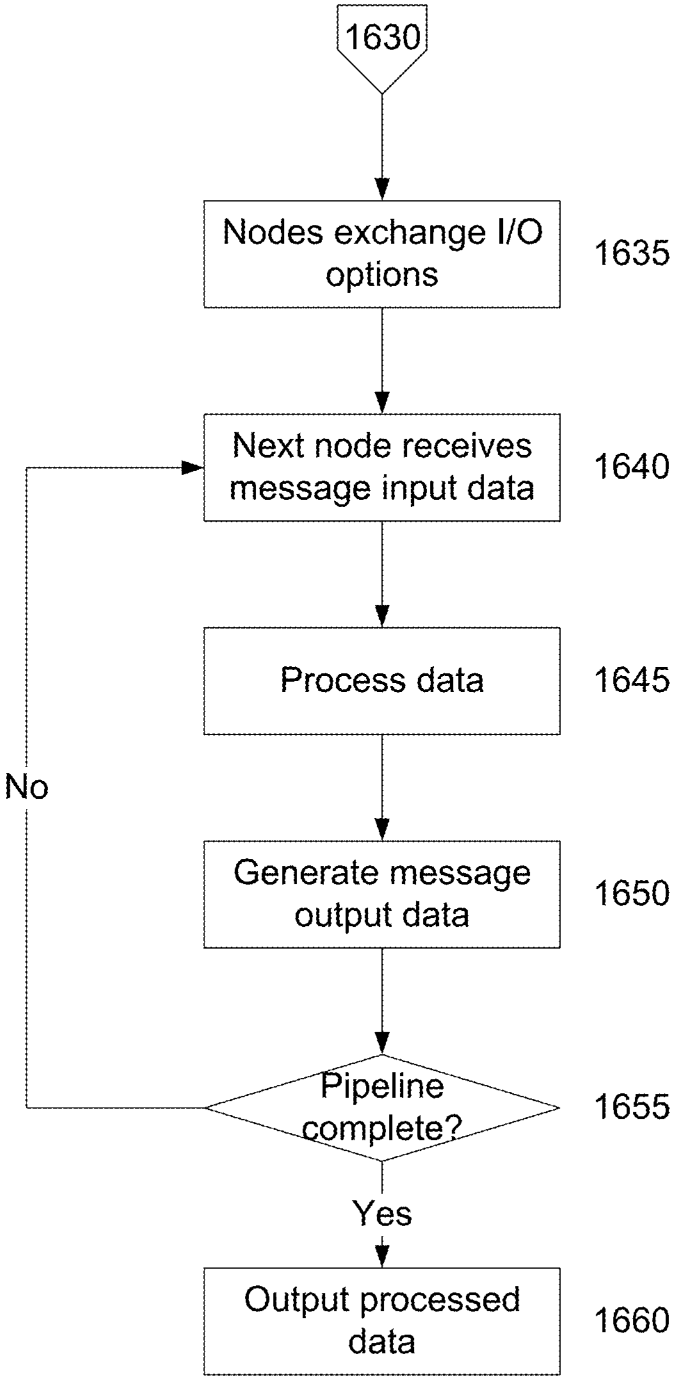

An example of the process of executing a pipeline will now be described in more detail with reference to FIGS. 16A and 16B.

In this example, the server 310 acquires a configuration file at step 1600, for example retrieving this from a database, or by creating the configuration file, as described above with respect to FIG. 6.

At step 1605 the configuration file is parsed by the server 310 to identify the nodes contained within the pipeline. The server 310 determines the configuration of each node from the configuration file and then passes the node configuration together with a request for the node to one or more node factories at step 1610. Upon receiving a request, the relevant node factory uses the node configuration to construct a node specification at step 1615, and then initialise the nodes at step 1620, allowing instances of the nodes to be constructed at step 1625.

The nodes are then executed 1630 in accordance with the pipeline, with the node interfaces initially communicating at step 1635 to exchange input/output options. For example, this is used to ensure that the format of data output by an upstream node can be parsed and interpreted correctly by a downstream node.

Following this, messages are passed between the nodes allowing the nodes to be perform the relevant data processing tasks. Thus, a node will receive a message containing input data at step 1640, either based on data received from the agent, or as output from an upstream node, with the node plugin processing the data at step 1645 and generating a message containing output data at step 1650. If the pipeline is not complete at step 1655, this is passed to the next downstream node, with the processing being repeated until all nodes have performed the required processing at which point the processed data is output at step 1660.

In one broad form, an aspect of the present invention seeks to provide a method for processing agent data received from one or more agents traversing an environment for use in a simultaneous localisation and mapping process, the method including: determining a pipeline including a number of nodes, each node relating to a respective data processing task implemented using a respective software module, wherein the nodes are interconnected so as to define a node sequence representing a sequence of data processing tasks; determining a node configuration for at least some of the nodes, the node configuration being indicative of one or more configuration options associated with the respective software module; using the node configuration and pipeline to: load software modules corresponding to the nodes in the pipeline; and, configure at least some of the software modules in accordance with the node configuration; and, executing the software modules by: providing input data to at least one software module based on the agent data; transferring output data from a software module to a next software module in accordance with the node sequence, so that the output data from the software module becomes input data for the next software module; and, providing output data from at least one software module as processed agent data.

In one broad form, an aspect of the present invention seeks to provide a system for processing agent data received from one or more agents traversing an environment for use in a simultaneous localisation and mapping process, the system including one or more suitably programmed processing devices configured to: determine a pipeline including a number of nodes, each node relating to a respective data processing task implemented using a respective software module, wherein the nodes are interconnected so as to define a node sequence representing a sequence of data processing tasks; determine a node configuration for at least some of the nodes, the node configuration being indicative of one or more configuration options associated with the respective software module; use the node configuration and pipeline to: load software modules corresponding to the nodes in the pipeline; and, configure at least some of the software modules in accordance with the node configuration; and, execute the software modules by: providing input data to at least one software module based on the agent data; transferring output data from a software module to a next software module in accordance with the node sequence, so that the output data from the software module becomes input data for the next software module; and, provide output data from at least one software module as processed agent data.

In one broad form, an aspect of the present invention seeks to provide a computer program product for processing agent data received from one or more agents traversing an environment for use in a simultaneous localisation and mapping process, the computer program product including computer executable code that when executed by one or more suitably programmed processing devices causes the one or more processing devices to: determine a pipeline including a number of nodes, each node relating to a respective data processing task implemented using a respective software module, wherein the nodes are interconnected so as to define a node sequence representing a sequence of data processing tasks; determine a node configuration for at least some of the nodes, the node configuration being indicative of one or more configuration options associated with the respective software module; use the node configuration and pipeline to: load software modules corresponding to the nodes in the pipeline; and, configure at least some of the software modules in accordance with the node configuration; and, execute the software modules by: providing input data to at least one software module based on the agent data; transferring output data from a software module to a next software module in accordance with the node sequence, so that the output data from the software module becomes input data for the next software module; and, provide output data from at least one software module as processed agent data.

In one broad form, an aspect of the present invention seeks to provide a method for processing agent data received from one or more agents traversing an environment for use in a simultaneous localisation and mapping process, the method including: acquiring a configuration file indicative of: a pipeline including a number of nodes, each node relating to a respective data processing task implemented using a respective software module, wherein the nodes are interconnected so as to define a node sequence representing a sequence of data processing tasks; and, a node configuration for at least some of the nodes, the node configuration being indicative of one or more configuration options associated with the respective software module; and, loading software modules corresponding to the nodes in the pipeline; configuring at least some of the software modules in accordance with the node configuration; and, executing the software modules by: providing input data to at least one software module based on the agent data; transferring output data from a software module to a next software module in accordance with the node sequence, so that the output data from the software module becomes input data for the next software module; and, providing output data from at least one software module as processed agent data.

In one broad form, an aspect of the present invention seeks to provide a system for processing agent data received from one or more agents traversing an environment for use in a simultaneous localisation and mapping process, the system including one or more processing devices configured to: acquire a configuration file indicative of: a pipeline including a number of nodes, each node relating to a respective data processing task implemented using a respective software module, wherein the nodes are interconnected so as to define a node sequence representing a sequence of data processing tasks; and, a node configuration for at least some of the nodes, the node configuration being indicative of one or more configuration options associated with the respective software module; and, load software modules corresponding to the nodes in the pipeline; configure at least some of the software modules in accordance with the node configuration; and, execute the software modules by: providing input data to at least one software module based on the agent data; transferring output data from a software module to a next software module in accordance with the node sequence, so that the output data from the software module becomes input data for the next software module; and, providing output data from at least one software module as processed agent data.

In one broad form, an aspect of the present invention seeks to provide a computer program product for processing agent data received from one or more agents traversing an environment for use in a simultaneous localisation and mapping process, the computer program product including computer executable code that when executed by one or more suitably programmed processing devices causes the one or more processing devices to: acquire a configuration file indicative of: a pipeline including a number of nodes, each node relating to a respective data processing task implemented using a respective software module, wherein the nodes are interconnected so as to define a node sequence representing a sequence of data processing tasks; and, a node configuration for at least some of the nodes, the node configuration being indicative of one or more configuration options associated with the respective software module; load software modules corresponding to the nodes in the pipeline; configure at least some of the software modules in accordance with the node configuration; and, execute the software modules by: providing input data to at least one software module based on the agent data; transferring output data from a software module to a next software module in accordance with the node sequence, so that the output data from the software module becomes input data for the next software module; and, providing output data from at least one software module as processed agent data.

In one broad form, an aspect of the present invention seeks to provide a method for processing agent data received from one or more agents traversing an environment for use in a simultaneous localisation and mapping process, the method including: determining a pipeline including a number of nodes, each node relating to a respective data processing task implemented using a respective software module, wherein the nodes are interconnected so as to define a node sequence representing a sequence of data processing tasks; determining a node configuration for at least some of the nodes, the node configuration being indicative of one or more configuration options associated with the respective software module; and, generating a configuration file based on the pipeline and the node configurations, wherein the configuration file is usable to configure software modules to perform processing of agent data.

In one broad form, an aspect of the present invention seeks to provide a system for processing agent data received from one or more agents traversing an environment for use in a simultaneous localisation and mapping process, the system including one or more processing devices configured to: determine a pipeline including a number of nodes, each node relating to a respective data processing task implemented using a respective software module, wherein the nodes are interconnected so as to define a node sequence representing a sequence of data processing tasks; determine a node configuration for at least some of the nodes, the node configuration being indicative of one or more configuration options associated with the respective software module; and, generate a configuration file based on the pipeline and the node configurations, wherein the configuration file is usable to configure software modules to perform processing of agent data.

In one broad form, an aspect of the present invention seeks to provide a computer program product for processing agent data received from one or more agents traversing an environment for use in a simultaneous localisation and mapping process, the computer program product including computer executable code that when executed by one or more suitably programmed processing devices causes the one or more processing devices to: determine a pipeline including a number of nodes, each node relating to a respective data processing task implemented using a respective software module, wherein the nodes are interconnected so as to define a node sequence representing a sequence of data processing tasks; determine a node configuration for at least some of the nodes, the node configuration being indicative of one or more configuration options associated with the respective software module; and, generate a configuration file based on the pipeline and the node configurations, wherein the configuration file is usable to configure software modules to perform processing of agent data.

Accordingly, the above described arrangements allow data from agents to be more readily analysed, and specifically allow nodes to be reused across multiple pipelines, whilst allowing pipelines for processing of data to be more easily created without intricate knowledge of the workings of different nodes, thereby making the analysis of agent data more straightforward.

Throughout this specification and claims which follow, unless the context requires otherwise, the word “comprise”, and variations such as “comprises” or “comprising”, will be understood to imply the inclusion of a stated integer or group of integers or steps but not the exclusion of any other integer or group of integers. As used herein and unless otherwise stated, the term “approximately” means±20%.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A method for processing agent data received from one or more agents traversing an environment for use in a simultaneous localisation and mapping process, the method including:

- a) determining a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in the simultaneous localisation and mapping process, wherein the method includes determining a pipeline by:
  - i) determining processing requirements for the agent data, and
  - ii) using the processing requirements to at least one of:
    - (1) retrieve one of a number of defined pipelines; and
    - (2) create a pipeline by:
      - (a) obtaining a number of nodes; and
      - (b) interconnecting the nodes to define the node sequence in accordance with the processing requirements;
- b) determining a node configuration for at least some of the nodes, the node configuration being indicative of one or more configuration options associated with the respective software module;
- c) using the node configuration and pipeline to:
  - i) load software modules corresponding to the nodes in the pipeline; and
  - ii) configure at least some of the software modules in accordance with the node configuration; and
- d) executing the software modules by:
  - i) providing input data to at least one software module based on the agent data, wherein at least some of the agent data includes at least one of:
    - (1) range data captured by a range sensor indicative of a distance between a sensor and part of the environment;
    - (2) point cloud data of at least part of the environment; and
    - (3) trajectory data indicative of movement of the agent when traversing at least part of the environment;
  - ii) transferring output data from a software module to a next software module in accordance with the node sequence, so that the output data from the software module becomes input data for the next software module; and
  - iii) providing output data from at least one software module as processed agent data, wherein the processed agent data is used in the simultaneous localisation and mapping process;
- e) determining an agent state;
- f) retrieving sensor details of the sensors associated with the agent;

g) determining a pipeline in accordance with the sensor details and processing requirements for the agent data;
h) validating additional data requirements are met for the pipeline; and
i) generating a configuration file for the pipeline.

2. A method according to claim 1, wherein the agent data includes at least one of:
a) sensor data from one or more sensors associated with the agent; and
b) a map of at least part of the environment.

3. A method according to claim 1, wherein each node includes an interface representing the data processing task, the interface acting as an input configured to receive input data and an output configured to provide output data, wherein:
a) the configuration options include at least one of:
i) an input configuration;
ii) an output configuration; and
iii) a processor configuration;
b) the input configuration is indicative of:
i) an input data format; and
ii) input data content; and
c) the output configuration is indicative of:
i) an output data format; and
ii) output data content.

4. A method according to claim 1, wherein the pipeline includes branches in which one node is connected to at least two other nodes so that output data from a software module is provided as input data to at least two other software modules.

5. A method according to claim 1, wherein the method includes obtaining a node by at least one of:
a) selecting one of a number of defined nodes; and
b) creating a node.

6. A method according to claim 5, wherein the method includes creating the node by at least one of:
a) selecting one of a number of available interfaces, each interface representing a data processing task; and
b) generating a software module in accordance with requirements associated with the interface.

7. A method according to claim 5, wherein the method includes selecting a node by at least one of:
a) selecting one of a number of available interfaces, each interface representing a respective data processing task; and
b) selecting one of a number of available software modules associated with the selected interface, each of the software modules being a respective implementation of the data processing task.

8. A method according to claim 1, wherein the method includes:
a) retrieving one or more of a number of defined workflows, each workflow being indicative of a sequence of one or more data processing tasks, wherein each workflow includes a number of interfaces and the method includes selecting one of a number of available software modules associated each interface; and
b) creating the pipeline using the one or more of the workflows.

9. A method according to claim 1, wherein the method includes:
a) determining an agent state for the one or more agents, the agent state being indicative of one or more of:
i) sensors associated with the agent;
ii) a sensor transformation representing a physical geometry of the sensors associated with the agent; and
iii) one or more trajectory types associated with the agent; and
b) using the state to at least one of:
i) select one or more nodes;
ii) retrieve one or more of a number of defined workflows; and
iii) retrieve one of a number of defined pipelines.

10. A method according to claim 1, wherein the method includes:
a) determining additional data requirements including at least one of:
i) input files; and
ii) calibration files; and
b) using the additional data requirements to at least one of:
i) select one or more nodes;
ii) retrieve one or more of a number of defined workflows; and
iii) retrieve one of a number of defined pipelines.

11. A method according to claim 1, wherein the input data is transferred between software modules using messages including:
a) a header including pipeline data indicative of at least one of:
i) a capture time of sensor data;
ii) an agent that captured the sensor data; and
iii) a frame; and
b) a payload including at least one of:
i) sensor data;
ii) processed sensor data; and
iii) output data from a previous software module.

12. A method according to claim 1, wherein the nodes are configured to at least one of:
a) perform calibration;
b) process sensor data;
c) generate a point cloud;
d) generate a map;
e) generate a sensor trajectory within an environment;
f) translate data between different reference frames;
g) convert data between different formats;
h) perform filtering;
i) perform a simultaneous mapping and localisation process; and
j) generate a simultaneous mapping and localisation process output.

13. A method according to claim 1, wherein the method includes:
a) in a configuration phase, generating a configuration file based on the pipeline and node configurations; and
b) in an execution phase, using the configuration file to:
i) load software modules corresponding to the nodes in the pipeline; and
ii) configure at least some of the software modules in accordance with the node configuration.

14. A method for processing agent data received from one or more agents traversing an environment for use in a simultaneous localisation and mapping process, the method including:
a) determining a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in the simultaneous localisation and mapping process, wherein the method includes determining a pipeline by;

i) determining processing requirements for the agent data; and
ii) using the processing requirements to at least one of:
(1) retrieve one of a number of defined pipelines; and
(2) create a pipeline by:
(a) obtaining a number of nodes; and
(b) interconnecting the nodes to define the node sequence in accordance with the processing requirements;
b) determining a node configuration for at least some of the nodes, the node configuration being indicative of one or more configuration options associated with the respective software module;
c) using the node configuration and pipeline to:
i) load software modules corresponding to the nodes in the pipeline; and
ii) configure at least some of the software modules in accordance with the node configuration;
d) executing the software modules by:
i) providing input data to at least one software module based on the agent data, wherein at least some of the agent data includes at least one of:
(1) range data captured by a range sensor indicative of a distance between a sensor and part of the environment;
(2) point cloud data of at least part of the environment; and
(3) trajectory data indicative of movement of the agent when traversing at least part of the environment;
ii) transferring output data from a software module to a next software module in accordance with the node sequence, so that the output data from the software module becomes input data for the next software module; and
iii) providing output data from at least one software module as processed agent data, wherein the processed agent data is used in the simultaneous localisation and mapping process; wherein:
e) the software modules are implemented as plugins to the interfaces;
f) the software modules are loaded dynamically during an execution phase; and
g) the software modules are implemented at least one of:
i) using executable modules;
ii) using class/inheritance modules; and
iii) by invoking functions.

15. A method according to claim 14, wherein the agent data includes at least one of:
a) sensor data from one or more sensors associated with the agent; and
b) a map of at least part of the environment.

16. A method according to claim 14, wherein each node includes an interface representing the data processing task, the interface acting as an input configured to receive input data and an output configured to provide output data, wherein:
a) the configuration options include at least one of:
i) an input configuration;
ii) an output configuration; and
iii) a processor configuration;
b) the input configuration is indicative of:
i) an input data format; and
ii) input data content; and
c) the output configuration is indicative of:
i) an output data format; and
ii) output data content.

17. A method according to claim 14, wherein the pipeline includes branches in which one node is connected to at least two other nodes so that output data from a software module is provided as input data to at least two other software modules.

18. A method for processing agent data received from one or more agents traversing an environment for use in a simultaneous localisation and mapping process, the method including implementing a selected node by:
a) determining a pipeline including a number of nodes, each node relating to a respective data processing task implemented using a respective software module, wherein the nodes are interconnected so as to define a node sequence representing a sequence of data processing tasks, and wherein the data processing tasks are tasks related to processing agent data for use in the simultaneous localisation and mapping process, wherein the method includes determining a pipeline by:
i) determining processing requirements for the agent data; and
ii) using the processing requirements to at least one of:
(1) retrieve one of a number of defined pipelines; and
(2) create a pipeline by:
(a) obtaining a number of nodes; and
(b) interconnecting the nodes to define the node sequence in accordance with the processing requirements;
b) determining a node configuration for at least some of the nodes, the node configuration being indicative of one or more configuration options associated with the respective software module;
c) using the node configuration and pipeline to:
i) load software modules corresponding to the nodes in the pipeline; and
ii) configure at least some of the software modules in accordance with the node configuration;
d) executing the software modules by:
i) providing input data to at least one software module based on the agent data, wherein at least some of the agent data includes at least one of:
(1) range data captured by a range sensor indicative of a distance between a sensor and part of the environment;
(2) point cloud data of at least part of the environment; and
(3) trajectory data indicative of movement of the agent when traversing at least part of the environment;
ii) transferring output data from a software module to a next software module in accordance with the node sequence, so that the output data from the software module becomes input data for the next software module; and
iii) providing output data from at least one software module as processed agent data, wherein the processed agent data is used in the simultaneous localisation and mapping process;
e) determining the node configuration for the selected node;
f) converting the configuration into a specification in accordance with a converter supplied by the selected node;
g) initialising the node;
h) providing the specification to the node, to allow the node to configure internal processes; and
i) providing a constructed node.

19. A method according to claim 18, wherein the agent data includes at least one of:

a) sensor data from one or more sensors associated with the agent; and b) a map of at least part of the environment.

20. A method according to claim 18, wherein each node includes an interface representing the data processing task, the interface acting as an input configured to receive input data and an output configured to provide output data, wherein:

a) the configuration options include at least one of:

i) an input configuration;

ii) an output configuration; and iii) a processor configuration;

b) the input configuration is indicative of:

i) an input data format; and ii) input data content; and c) the output configuration is indicative of:

i) an output data format; and ii) output data content.

* * * * *